US011824612B2

(12) United States Patent
Logothetis et al.

(10) Patent No.: US 11,824,612 B2
(45) Date of Patent: Nov. 21, 2023

(54) DETERMINING A CORRECTION TO BE APPLIED TO A MAIN BEAM OF AN ANTENNA SYSTEM FOR A MOVING VEHICLE

(71) Applicant: AIRSPAN IP HOLDCO LLC, Boca Raton, FL (US)

(72) Inventors: Andrew Logothetis, High Wycombe (GB); Jianling Chen, London (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 0 days.

(21) Appl. No.: 17/863,639

(22) Filed: Jul. 13, 2022

(65) Prior Publication Data
US 2023/0023976 A1 Jan. 26, 2023

(30) Foreign Application Priority Data

Jul. 19, 2021 (GB) ...................................... 2110384

(51) Int. Cl.
H04L 5/12 (2006.01)
H04B 7/06 (2006.01)
H01Q 3/10 (2006.01)
H01Q 3/34 (2006.01)

(52) U.S. Cl.
CPC ............. *H04B 7/0639* (2013.01); *H01Q 3/10* (2013.01); *H01Q 3/34* (2013.01)

(58) Field of Classification Search
CPC ........... H04B 7/0639; H01Q 3/10; H01Q 3/34
USPC ................ 375/262, 261, 259, 219, 295, 316
See application file for complete search history.

(56) References Cited

U.S. PATENT DOCUMENTS

| 6,937,186 | B1 | 8/2005 | Dybdal et al. |
| 7,218,273 | B1 | 5/2007 | Webster, Jr. et al. |
| 2006/0077097 | A1 | 4/2006 | Dybdal et al. |
| 2007/0140389 | A1* | 6/2007 | Lindenmeier .......... H04B 7/084 375/347 |
| 2014/0292578 | A1 | 10/2014 | Ibrahim et al. |
| 2017/0223749 | A1 | 8/2017 | Sheldon et al. |
| 2018/0167102 | A1 | 6/2018 | Ray |

FOREIGN PATENT DOCUMENTS

GB      2135520 A      8/1984

OTHER PUBLICATIONS

GB Search Report for GB2110384.1 (parent) dated Jan. 10, 2022, 4 pages.

* cited by examiner

*Primary Examiner* — Zewdu A Kassa
(74) *Attorney, Agent, or Firm* — Haynes Beffel & Wolfeld LLP; Andrew L. Dunlap

(57) ABSTRACT

An antenna system for a moving vehicle, the antenna system comprising: a main antenna to generate a main beam; a measurement antenna to generate a measurement beam; and control circuitry to perform an adjustment process by: rotating the main beam to an initial bearing angle; rotating the measurement beam independently of the main beam to receive signals at positions to either side of the initial bearing angle; comparing at least one metric measured for the signals received by the measurement antenna at the positions to either side of the initial bearing angle to generate a comparison output; and determining, based on the comparison output, a correction to be applied to the initial bearing angle of the main beam.

24 Claims, 16 Drawing Sheets

DETERMINING A CORRECTION TO BE APPLIED TO A MAIN BEAM OF AN ANTENNA SYSTEM FOR A MOVING VEHICLE

The present technique relates to the field of communication, and in particular to the field of communication systems for moving vehicles.

A moving vehicle such as an aircraft can be provided with an antenna system for communication with, for example, a further antenna system (e.g. a base station on the ground). In an antenna system for a moving vehicle, various factors can lead to an erroneous antenna beam angle (e.g. a bearing angle of the antenna beam) as the antenna system seeks to direct its beam towards a target (e.g. a base station (BS)).

Various factors can contribute to an erroneous antenna beam angle. For example, the motion of the vehicle can lead to errors in measuring the position and/or orientation of the vehicle. For example, these errors can be particularly acute during rapid maneuvering of the moving vehicle—for example, it has been observed that the reported yaw reading in a rapidly maneuvering aircraft can be delayed and even after the maneuvering has completed, it can take several minutes to return to a correct value. For example, this could be due (but not limited) to long-term averaging within the on-board instrumentation units. Another potential source of error in position and orientation readings is antenna misalignment during the installation process.

If the antenna system uses narrow beams (e.g. for communication using standards such as LTE or 5G NR), the effect of these errors on communication can be particularly significant. In particular, the margin for error in directing a narrower beam (e.g. a beam which covers a narrower range of angles) is smaller than that of a wider beam.

Viewed from a first example, there is provided an antenna system for a moving vehicle, the antenna system comprising:
  a main antenna to generate a main beam;
  a measurement antenna to generate a measurement beam; and
  control circuitry to perform an adjustment process by:
    rotating the main beam to an initial bearing angle;
    rotating the measurement beam independently of the main beam to receive signals at positions to either side of the initial bearing angle;
    comparing at least one metric measured for the signals received by the measurement antenna at the positions to either side of the initial bearing angle to generate a comparison output; and
    determining, based on the comparison output, a correction to be applied to the initial bearing angle of the main beam.

Viewed from another example, there is provided a method of operating an antenna system for a moving vehicle, the method comprising:
  generating a main beam;
  generating a measurement beam; and
  performing an adjustment process by:
    rotating the main beam to an initial bearing angle;
    rotating the measurement beam independently of the main beam to receive signals at positions to either side of the initial bearing angle;
    comparing at least one metric measured for the signals received by the measurement antenna at the positions to either side of the initial bearing angle to generate a comparison output; and
    determining, based on the comparison output, a correction to be applied to the initial bearing angle of the main beam.

Further aspects, features and advantages of the present technique will be apparent from the following description of examples, which is to be read in conjunction with the accompanying drawings, in which:

FIG. 1 schematically illustrates an aircraft with an antenna system for communication with a base station;

FIG. 2 schematically illustrates how the position and orientation of an aircraft can be measured;

FIGS. 3, 4, 5 schematically illustrate an aircraft using a measurement beam to determine a correction to be applied to the bearing angle of a main beam;

FIG. 6 schematically illustrates an example of an antenna system;

FIG. 7 schematically illustrates examples of main and measurement antennas;

FIG. 8 is a flow diagram showing an example of a method for correcting the bearing angle of a main antenna beam;

FIG. 9 schematically illustrates an example of an antenna system;

Figure 14:
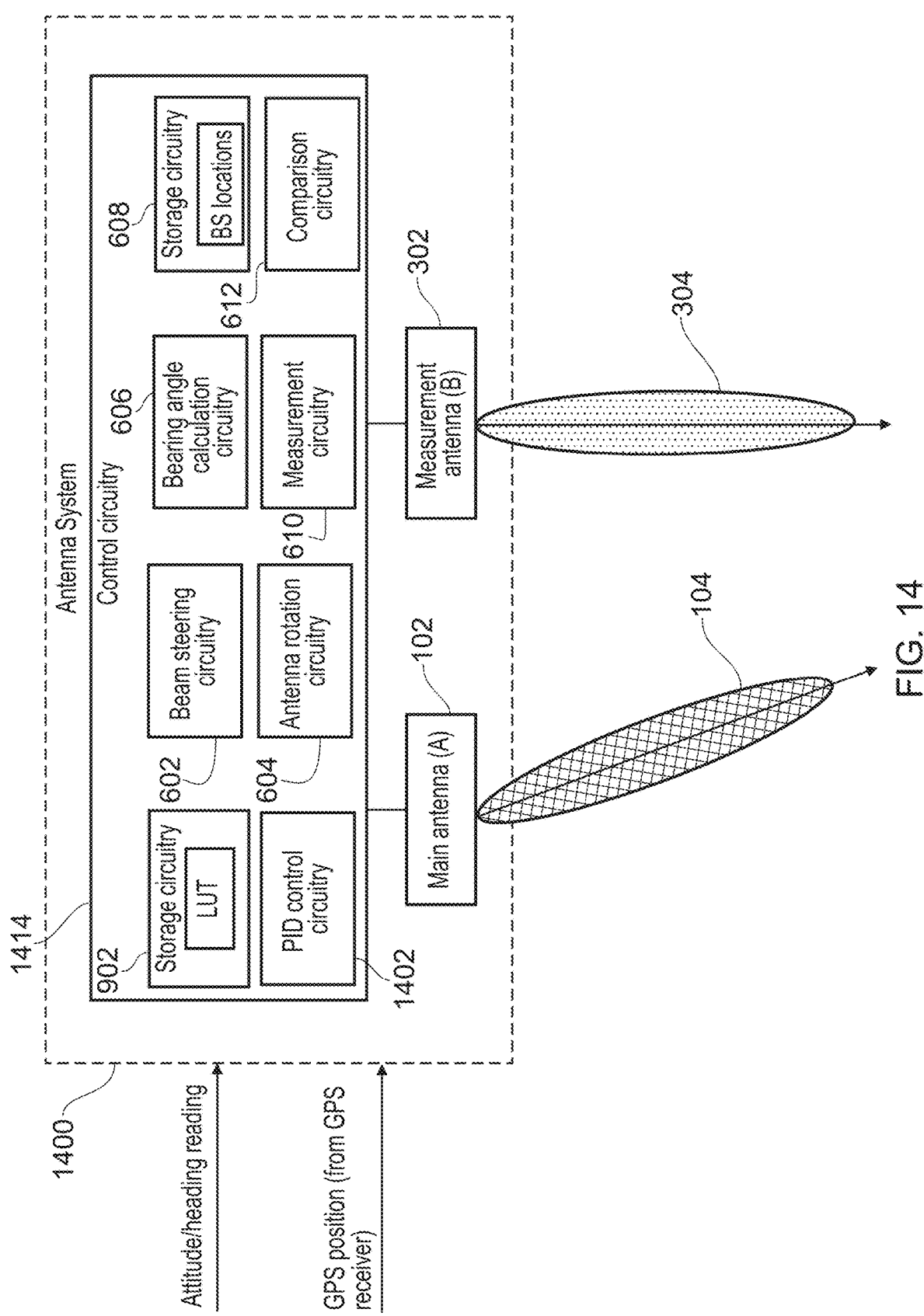
Figure 15:
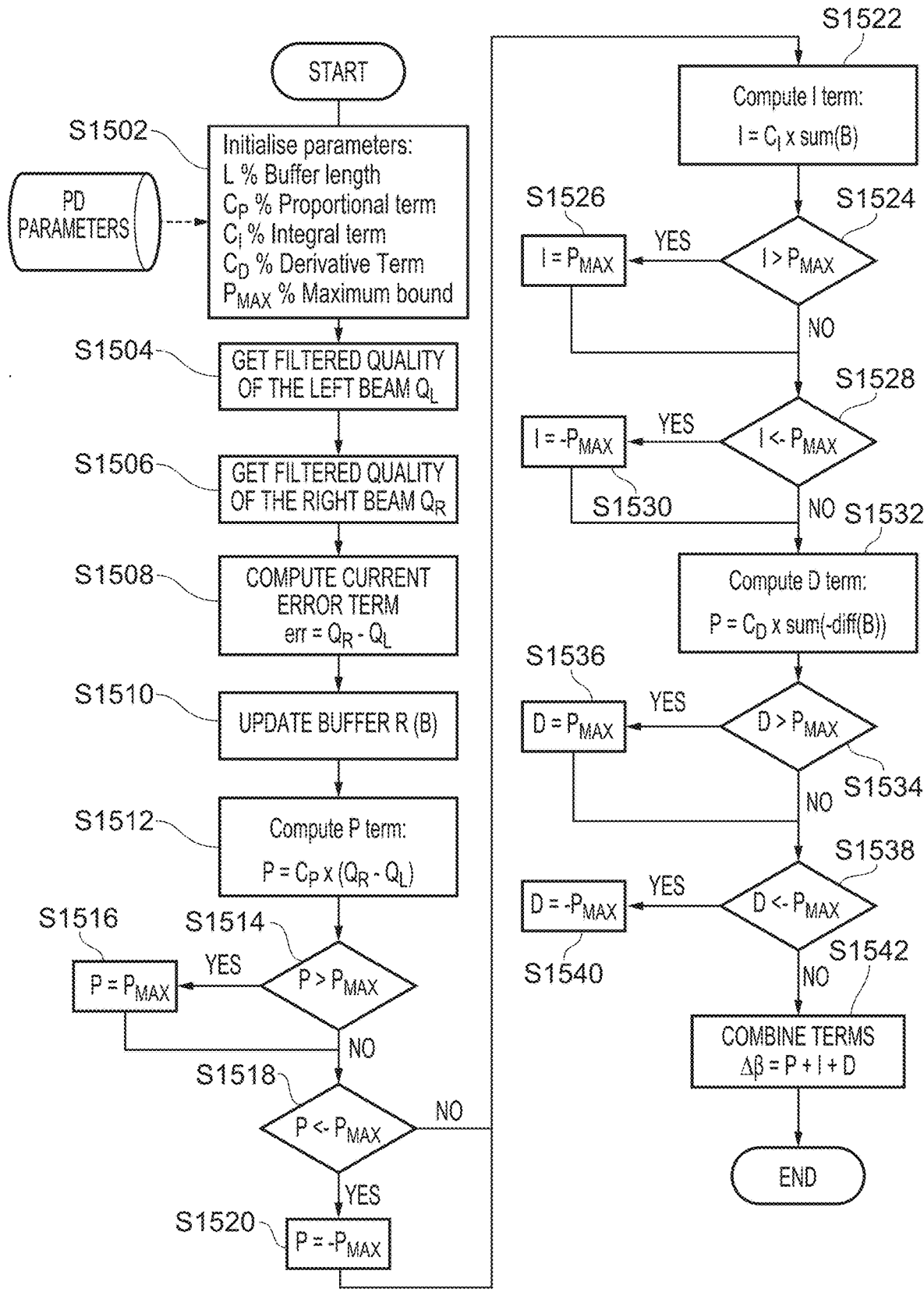
Figure 16:
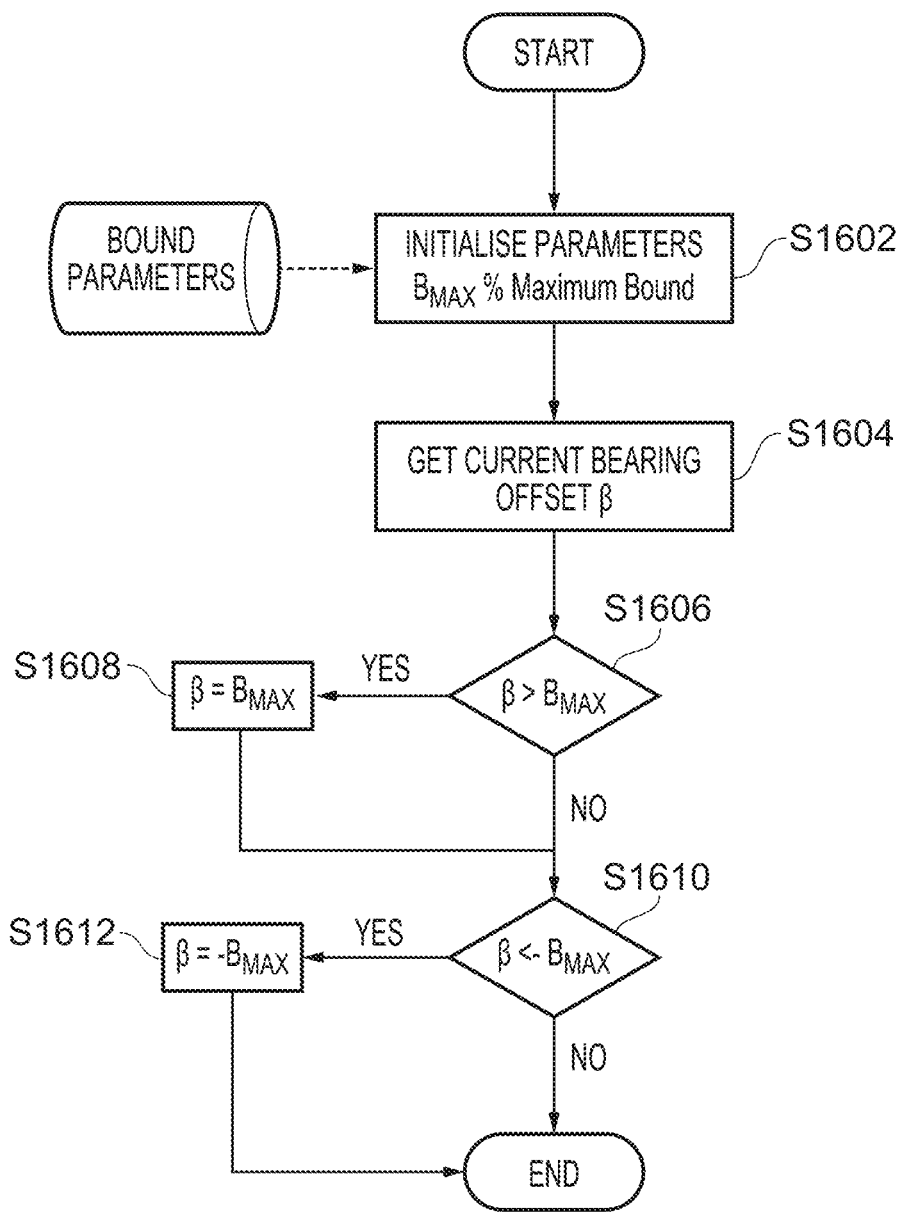

FIG. 14 schematically illustrates an example of an antenna system;

FIG. 15 is a flow diagram showing a method of calculating a correction to be applied to the main beam using a PID controller; and FIG. 16 is a flow diagram showing a method for adjusting the correction to ensure that it is within predetermined bounds.

Before discussing example implementations with reference to the accompanying figures, the following description of example implementations and associated advantages is provided.

In accordance with one example configuration there is provided an antenna system for a moving vehicle, the antenna system comprising a main antenna to generate a main beam, and control circuitry to rotate (e.g. steer or direct) the main beam. In particular, the main beam is rotated to an initial bearing angle. The moving vehicle can be any vehicle, and it will be appreciated that the antenna system is not limited to use within a moving vehicle. For example, while the antenna system is suitable for use with a moving vehicle (and is particularly advantageous in such an environment), it can also be installed and used outside of a moving vehicle if desired.

As discussed above, it can be useful to calculate a correction to be applied to the initial bearing angle selected for the main beam, to correct for any errors introduced in the determination of the initial bearing angle.

The antenna apparatus of the present technique also comprises a measurement antenna (e.g. separate from the main antenna) to generate a measurement beam, which is rotated by the control circuitry independently of the rotation of the main beam. To correct the bearing angle of the main beam, the control circuitry performs an adjustment process using this measurement beam.

The adjustment process involves rotating the main beam to an initial bearing angle, and rotating the measurement beam to receive signals at positions to either side of the initial bearing angle. For example, the measurement beam could be steered first to one side of the initial bearing angle (e.g. steered to the left/anticlockwise when viewed from a given angle) to receive a first signal, and then steered to the opposite side of the initial bearing angle (e.g. steered to the right/clockwise when viewed from that same angle) to receive a second angle. However, it will be appreciated that this is just one example, and in other examples the measurement beam could be steered so that it receives signals at more than two different positions.

The adjustment process performed by the control circuitry then comprises generating a comparison output by comparing at least one metric of each of the signals received by the measurement antenna when steered to the positions to either side of the initial bearing angle. The at least one metric can be any metric/measurement relating to those signals, and the control circuitry can compare a single metric (e.g. a single measurement for each of the signals) or more than one metric.

Using the comparison output, the control circuitry can then determine a correction to be applied to the initial bearing angle of the main beam. For example, the correction determined by the control circuitry could indicate whether or not the main beam should be rotated from the initial bearing angle to another bearing angle, in which direction the main beam should be rotated, and/or how much it should be rotated by.

Using this process, the control circuitry can determine (e.g. by calculation) a correction to be applied to the bearing angle of the main beam to—at least partially—account for any potential errors in its determination of the initial bearing angle even while the vehicle is maneuvering. In particular, by comparing the at least one metric for a signal received to one side of the initial bearing angle with that of a signal received to the other side (e.g. instead of performing a trial-and-error based approach of, for example, comparing a signal received at the initial bearing angle with a signal received at a different angle to identify whether the different angle), a more accurate and precise determination of the correction to be applied to the initial bearing angle can be made. Moreover, employing a second antenna—the measurement antenna—for receiving the signals to either side of the initial bearing angle avoids the need to (for example) rotate the main beam to receive these signals. Hence, the present technique allows the correction to be determined without interrupting any communication taking place using the main beam. This allows the antenna system to provide improved communication with, for example, other antenna systems (for example, in terms of improved link quality or signal strength, or greater reliability).

In some examples, the antenna system is configured to communicate with a further antenna system using the main beam, and the control circuitry is configured to calculate the initial bearing angle in dependence on an estimated direction of the further antenna system relative to the antenna system.

In an antenna system for a moving vehicle, it can be the case that the exact location of the further antenna system (e.g. a base station, BS) relative to the moving vehicle (or, more precisely, relative to the antenna system) is not known. As a result, it could be that the direction of the further antenna system (e.g. an angle of a straight line drawn between the antenna system and the further antenna system) is not accurately known. The present technique can be particularly useful in such situations, where the bearing angle of the main beam is initialised based on a predicted/estimated direction of the further antenna system (e.g. the initial bearing angle can be based on the initial direction of the further antenna system), and the adjustment process can be used to correct the bearing angle.

In some examples, the estimated direction is based on a recorded position of the further antenna system and at least one of: an estimated position of the antenna system (e.g. a location—this could, for example, be expressed using coordinates), and an estimated orientation of the antenna system (e.g. a direction in which the antenna system is predicted to be facing). The inventors of the present technique realised that, while the position of the further antenna system may be known (for example, base stations may be in fixed positions), the relative direction of the further antenna system relative to the antenna system might, nonetheless, not be accurately known. The present technique can, therefore, still be useful even when a recorded position of the further antenna system is known, for example if the estimated direction of the further antenna system is determined based on an estimated position of the antenna system and/or an estimated orientation of the antenna system.

In some examples, the control circuitry is configured to calculate the estimated position of the antenna system based on at least one of: satellite positioning data indicative of a location of the moving vehicle, and information indicating a position of the antenna system relative to the moving vehicle. The satellite positioning data comprises data (e.g. time signals) received from satellites, which can be used to determine the location of the moving vehicle. The data could be received from satellites forming part of any global navigation system; for example, the satellite positioning data could be received from satellites in systems such as the United States Global Positioning System (GPS), the Russian Global Navigation Satellite System (GLONASS), the Chinese BeiDou system, or the European Galileo system. The location could, for example, be indicated as coordinates—for example, the location could indicate the longitude and latitude of the moving vehicle. The location could also include an indication of the altitude (e.g. height above mean sea level (MSL)) of the vehicle. Meanwhile, the information indicating a position of the antenna system relative to the moving vehicle (e.g. where on the moving vehicle the antenna system is installed) is, in some examples, included within installation information made available to (e.g. stored on or with) the antenna system.

There can be errors introduced when the estimated position is based on either of these measurements. For example, when the estimated position is based on the satellite positioning data, errors can be introduced due to the movement of the vehicle, potentially causing the most recently received global positioning data to quickly become out of date—this can particularly be the case during rapid maneuvering of the vehicle. The degree of the error in the location can vary over time, for example depending on the speed or acceleration of the moving vehicle. Errors in the installation information are typically static/fixed (e.g. the installation information is generally incorrect by the same fixed amount) and can, for example, be introduced by antenna misalignment during the installation process.

The present technique can be used to correct these errors in the estimated position, regardless of whether they are time-varying errors or fixed errors. Moreover, it will be appreciated that these are just examples of how the estimated position can be calculated. For example, where global positioning data is not available, the longitude and latitude of the vehicle could instead be determined manually, and the altitude could be measured with an altimeter (altitude meter). The present technique is equally applicable when using these techniques, regardless of whether satellite positioning data is available. It will also be appreciated that the position information need not always include an altitude— for example, for a land-based vehicle (e.g. a car or train) or a boat, the altitude will typically not be required to determine an estimated location of the further antenna system.

In some examples, the control circuitry is configured to calculate the estimated orientation of the antenna system based on at least one of: a direction reading indicative of a rotation of the moving vehicle in at least one plane, and information indicating an orientation of the antenna system relative to the moving vehicle.

The direction reading could include measurements indicating the rotation of the vehicle about one or more different axes (e.g. in one or more different planes). For example, the direction reading can indicate the measured yaw (e.g. the rotation of the vehicle in a horizontal plane—e.g. a plane parallel with the surface of the Earth; for example, the yaw could be measured using a compass, as an angle relative to North), pitch (how far up or down the nose of the vehicle is pointing, e.g. the angle of the nose relative to the horizontal plane), and/or roll (e.g. the rotation of the vehicle about a central axis, e.g. for an aircraft, this could be the angle of the wings relative to the horizontal plane). There can be errors in any of these measurements, which can vary over time. For example, errors in the yaw can be particularly noticeable when the vehicle is turning. It will be appreciated that the direction reading need not necessarily include all three of the yaw, pitch and roll—for example, in a land-based vehicle such as a car or train, it could be that the pitch and/or roll are assumed to be constant.

Regarding the information indicating the orientation of the antenna system relative to the moving vehicle, this could again be included in installation information made available to the antenna system, and again could be erroneous due to antenna misalignment during the installation process. Any errors introduced by the information indicating the orientation of the antenna system relative to the moving vehicle are typically static.

The present technique can therefore be used to correct for errors in the initial bearing angle due to any of the above measurements of the estimated orientation of the antenna system, whether these are static errors or time-varying errors.

As can be seen from the above discussion, the present technique can correct for errors in the estimated direction of the further antenna system caused by any of a wide variety of different factors, including both static and time-varying factors. These errors can be present even if the position of the further antenna system is known.

In some examples, the antenna apparatus comprises storage circuitry to store, for each of a plurality of further antenna systems, a corresponding recorded position, and the control circuitry is configured to receive, from the storage circuitry, the recorded position of the further antenna system prior to calculating the initial bearing angle.

This is possible since the further antenna systems (e.g. base stations) are typically at fixed positions, and thus their positions can be measured and recorded accurately. In these examples, storing recorded positions for the plurality of further antenna systems can allow the initial bearing angle to be determined such that the main beam is directed roughly in the direction of the further antenna system (e.g. by determining the initial bearing angle on the basis of the estimated position and/or orientation of the antenna system and the known position of the further antenna system). This allows the bearing angle of the main beam to be corrected with fewer and/or less significant adjustments, thus improving the efficiency of the antenna system as a whole, and decreasing the amount of time during which the quality of communication is degraded due to an incorrect bearing angle.

In some examples, the antenna system is configured to communicate with the further antenna system using both the main beam and the measurement beam. While, in some examples, the antenna system is configured to use only the main beam for communication, with the measurement beam being primarily used for the adjustment process, the inventors realised that utilising the main beam and the measurement beam in combination for communication with the further antenna system can provide improved link quality and can lead to an improved bandwidth between the antenna system and the further antenna system. In some embodiments, the main beam and the measurement beam are used for communication when the adjustment process is not taking place thereby extending the utilisation of the measurement beam. In other words, the measurement beam is used in these examples as a diversity beam, enhancing the radio link quality.

In some examples, the control circuitry is configured to perform a plurality of iterations of the adjustment process in which, in each iteration, the control circuitry is configured to determine a corrected bearing angle by applying the correction to the initial bearing angle specified for that iteration, and for each iteration after the first iteration, the initial bearing angle comprises the corrected bearing angle determined in the preceding iteration.

In these examples, the adjustment process is performed repeatedly, with the output of each iteration (e.g. a corrected bearing angle) being the input for the next iteration (e.g. the position of the main beam (the initial bearing angle) is updated at each iteration). In this way, the antenna system can rapidly and continuously adjust the angle of the main beam as the vehicle moves. This can allow the main beam to remain locked onto its communication target, with a limited amount of error, which can be expected to reduce at each iteration.

In some examples, the at least one metric comprises a measure of a signal strength of the signals received by the measurement antenna at the positions to either side of the initial bearing angle.

While other metrics can be used as the at least one metric (e.g. the signal quality, which can be measured as Reference Signal Received Quality-RSRQ—or Signal to Interference plus Noise Ratio-SINR), the signal strength can be a particularly good choice since it gives a more direct indication of the direction which will provide the strongest signal. While the signal quality can still be useful as the at least one metric, and will still allow a reasonable determination of the correction to be made, there could be situations where the interference (which can affect the signal quality more than it affects the signal strength) is spatially dependent (e.g. there could be more interference to the left of the initial bearing angle than to the right, due to the location of the cause of the interference or due to the shape of the measurement beam). It will be appreciated, however, that it is equally possible to use more than one metric in the adjustment process—for example, the signal strength and signal quality could both be used.

In some examples, the measure of the signal strength comprises a measure of Reference Signals Received Power (RSRP). However, it will be appreciated that this is just one example of how the signal strength could be measured, and other examples are also possible. Moreover, as noted above, it is also possible to use more than one metric in the adjustment process—for example, multiple different measurements of the signal strength could be used in combination.

In some examples, the measure of the signal strength comprises a filtered signal strength of the signals received by the measurement antenna at the positions to either side of the initial bearing angle. Applying a filter to the signal strength measurements can remove some of the noise in the measurements, thus improving the accuracy of the adjustment process.

In some examples, the control circuitry is configured to compare the measure of the signal strength of the signals received by the measurement antenna at the positions to either side of the initial bearing angle to determine which of the positions provides a greater signal strength. In these examples, the control circuitry is also configured to calculate the correction so that, when the correction is applied to the initial bearing angle of the main beam, the main beam is steered towards the position providing the greater signal strength. In this way, the direction of the correction to be applied can be determined based on the measurements of the signal strength, allowing the strength of signals sent or received using the main beam to be improved when the correction is applied.

For example, this could involve the control circuitry determining whether the strength of a signal received at one side of the initial bearing angle was greater than, equal to or less than the strength of a signal received at the opposite side of the initial bearing angle. If the strength of the signal received at one side is greater than the strength of the signal received at the other side, the control circuitry steers the main beam towards the side with the greater signal strength. On the other hand, if the strength is equal for the signals to either side of the initial bearing angle, the control circuitry determines not to adjust the angle of the main beam (e.g. by determining a correction of zero).

To determine the amount of the correction to be applied to the main beam (e.g. the number of degrees by which the main beam is to be rotated), a number of different approaches can be taken. In some examples, the control circuitry is configured to apply the correction by rotating the main beam from the initial bearing angle by a predetermined amount, in a direction indicated by the correction. For example, the predetermined amount could be a predetermined number of degrees of rotation of the main beam. The number of degrees of rotation chosen as the predetermined amount will depend on the implementation of the present technique—the smaller the number of degrees, the more precisely the correction can be determined.

This could—for example—utilise a bang-bang (e.g. 2-step or on-off) controller, which is a feedback controller that switches abruptly between two states (e.g. the two states could be +/− the predetermined amount). Due to its simplicity, this approach requires less circuitry (e.g. less circuit area) than other, more complex approaches, thus reducing costs associated with development and manufacture of the antenna system. However, a downside of this simple approach is that convergence to a correct/desired bearing angle (e.g. when performing multiple iterations of the adjustment process) can take significantly longer than some other approaches. Thus, there is a trade-off between simplicity (and the associated benefits in terms of cost) and accuracy.

In some examples, the control circuitry comprises proportional-integral-derivative (PID) control circuitry to calculate the correction. The inventors realised that the use of a PID controller can allow a more accurate correction to be calculated quickly.

In some examples, the PID control circuitry is configured to calculate the correction on the basis of an error defined as a difference between values of the at least one metric measured for the signals received by the measurement antenna at the positions to either side of the initial bearing angle. In these examples, the PID control circuitry is configured to calculate the correction by summing a proportional term (P) proportional to a current value of an error, an integral term (I) proportional to an integral of past values of the error over time, and a derivative term (D) proportional to a current rate of change of the error. By using a combination of proportional, integral and derivative terms in this way, a more accurate determination of the correction can be made.

In some examples, the control circuitry is configured to compare the correction to an upper threshold value and a lower threshold value. In these examples, when the correction has a value greater than the upper threshold value, the control circuitry is configured to update the correction to the upper threshold value, whereas when the correction has a value less than the lower threshold value, the control circuitry is configured to update the correction to the lower threshold value.

This approach causes the correction applied to the main beam to be within a set range of values, reducing the effects of errors in the calculation of the correction amount (e.g. due to rapid acceleration of the vehicle). The values chosen for the upper and lower threshold values will depend on the particular implementation. For example, the thresholds selected could depend on a degree of error that is expected in the calculation of the correction, with the thresholds being set to prevent the correction to be applied to the main beam being outside of those expected error values.

In some examples, each of the main antenna and the measurement antenna comprises an antenna array, and beamforming circuitry to control the antenna array to generate a beam having a peak antenna array gain in a peak direction. In these examples, the control circuitry is configured to rotate the main beam by adjusting the peak direction of the main beam, wherein the main beam is rotated to the initial bearing angle when the peak direction is at the initial bearing angle, and the control circuitry is configured to rotate the measurement beam to a measurement angle by adjusting the peak direction of the measurement beam to be at the measurement angle. Thus, in these examples, the direction of each of the main and measurement beams indicate the direction of the peak antenna array gain.

In some examples, the control circuitry comprises at least one of antenna rotation circuitry and beam steering circuitry. The antenna rotation circuitry can mechanically steer the main beam by rotating the main antenna, and/or mechanically steer the measurement beam by rotating the measurement antenna, while the beam steering circuitry can electronically steer the main beam by adjusting the shape of the main beam, and/or electronically steer the measurement beam by adjusting the shape of the measurement beam.

The control circuitry could include one or both of the antenna rotation circuitry and the beam steering circuitry. The rotation of the main and measurement beams can, therefore, involve one or both of mechanical and electrical steering. The main and measurement beams can, in some examples, be rotated using the same technique (e.g. both mechanically steered, both electronically steered, or both rotated using a combination of mechanical and electronic steering). However, it will be appreciated that this need not necessarily be the case, since the main and measurement beams are rotated independently of one another—instead, different techniques could be used to rotate each of the main and measurement beams.

In some examples, the control circuitry is configured to rotate the measurement beam to a measurement angle, and the positions to either side of the initial bearing angle comprise a pair of measurement angles to either side of the initial bearing angle. For example, the pair of measurement angles could be two related measurement angles.

In some examples, the antenna apparatus comprises storage circuitry to store a look-up table (LUT) indicating corresponding measurement angles for each of a plurality of bearing angles of the main beam. In these examples, the control circuitry is configured to determine, based on the LUT, the pair of measurement angles corresponding to the initial bearing angle, and to rotate the measurement beam to each of the pair of measurement angles to receive the signals at the positions to either side of the initial bearing angle. This provides a simple mechanism by which the control circuitry can determine which measurement angles to choose for a given initial bearing angle.

In some examples, the measurement beam is configured to receive communication signals from a further antenna system, an antenna array gain of the measurement beam is dependent on the measurement angle and a direction of the further antenna system, and the storage circuitry is configured to store, in the look-up table, the corresponding measurement angles for the plurality of bearing angles of the main beam such that, when the measurement beam is rotated to each of the pair of measurement angles corresponding to the initial bearing angle, gain curves for each of the pair of measurement angles intersect when the direction of the further antenna system is the initial bearing angle, wherein each of the gain curves comprises a graph representing the antenna array gain of the measurement beam as a function of the direction of the further antenna system.

When an antenna is rotated to a particular bearing angle, it will typically still be capable of transmitting/receiving signals in directions other than that particular bearing angle, albeit with (potentially) lower gain. The gain of an antenna array when rotated to a given bearing angle can therefore be represented by a gain curve, which is a graph of the antenna array gain as a function of direction (e.g. as a function of the direction of a further antenna system with which the antenna array can communicate)—for example, this could be a graph with antenna array gain in decibels relative to isotropic radiator (dBi) on the vertical (y) axis, and direction in degrees on the horizontal (x) axis. The gain curve will typically have several lobes (e.g. several peaks), with a main lobe (with the highest gain) centred on the bearing angle. In the example described above, the pair of measurement angles stored in the look-up table for a given bearing angle are selected so that the gain curves for the measurement antenna when rotated to each of the measurement angles—when both represented on the same graph—intersect at a point having a value along the x-axis equal to the given bearing angle. For example, if the gain curves for the main beam when rotated to the given bearing angle, and the measurement beam when rotated to each of the corresponding pair of measurement angles are represented on the same set of axes, the gain curves for the two measurement angles will intersect directly below the peak of the main lobe of the gain curve of the main beam.

This approach to choosing the measurement angles can be particularly advantageous, because with this arrangement if the peak antenna array gain is equal when the measurement beam is steered to each of the pair of measurement angles, then it follows that the given bearing angle of the main beam is correct and so no correction or a correction of zero needs to be applied.

It will be appreciated that the gain curves for the pair of measurement angles can intersect at more than one location—for example, when the gain curve has multiple lobes. In this case, the measurement angles are selected such that the main lobes of the gain curves intersect at the given bearing angle. By focusing on the main lobe in this way, where the gain at the point of intersection is likely to be higher than for other lobes, the error in calculating the correction can be reduced.

In some examples, the storage circuitry is configured to store, in the look-up table, the corresponding measurement angles for the plurality of bearing angles of the main beam such that when the measurement beam is rotated to each of the corresponding measurement angles corresponding to a given bearing angle of the main beam, the gain curves for each of the pair of measurement angles intersect at a point which is a predetermined amount below the peak antenna array gain of the main beam when rotated to the given bearing angle, wherein the predetermined amount is the same for each of the bearing angles.

By selecting the measurement angles so that the gain curves intersect with an antenna array gain a predetermined amount (e.g. a gain drop) below the peak of the antenna array gain of the main beam when rotated to the given bearing angle in this way, the gain drop can be chosen so that the antenna array loss is reduced, thus providing greater link quality. On the other hand, the reduced loss provided by selecting a gain drop within a certain range (e.g. dependent on the arrangement of the antennas) can also be balanced with improving the accuracy with which the correction can be determined. For example, a larger gain drop can allow the difference in signal qualities between the signals received at each of the pair of measurement angles to be clearer (and thus easier to calculate accurately).

In some examples, the moving vehicle comprises an aircraft. For example, this could be an aeroplane or a helicopter. It is often possible to reach higher speeds in an aircraft than in other vehicles, and in particular the maximum acceleration (e.g. in terms of an increase or decrease in speed, or a change in direction) possible can be much higher in an aircraft than in other moving vehicles. Moreover, an aircraft (unlike some land- and sea-based vehicles, for example) is typically able to move and rotate within three degrees of freedom, rather than just two. As a result, the present technique—which can allow the bearing angle of the main beam to be rapidly corrected, even as the aircraft manoeuvres—can be particularly beneficial in an antenna system installed in an aircraft.

Figure 1:
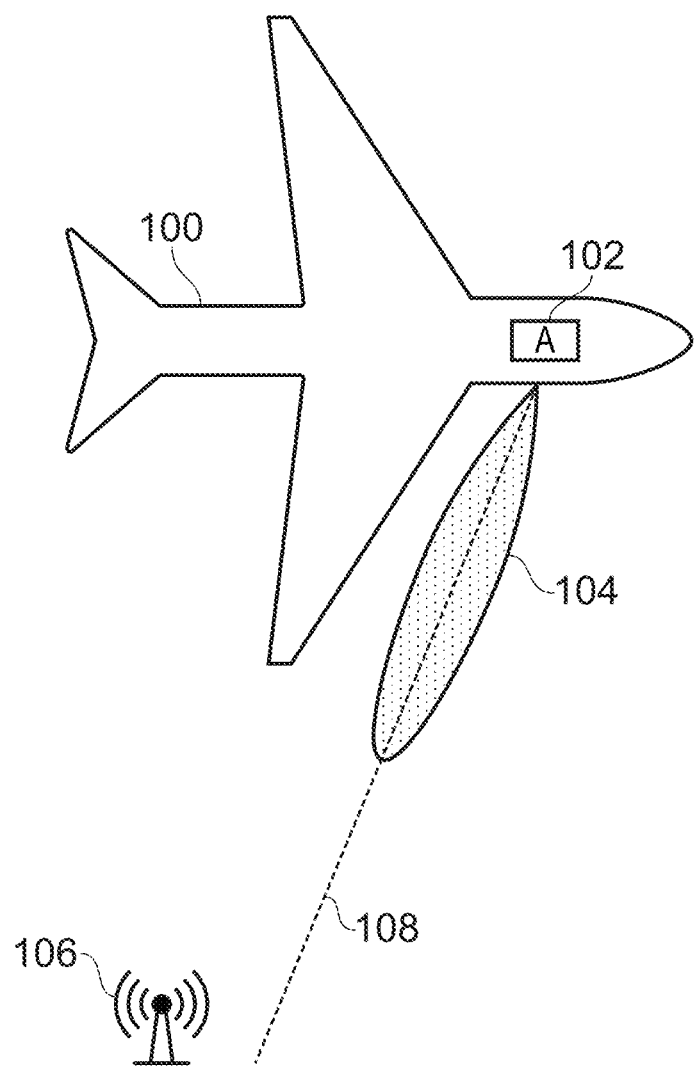

FIG. 1 shows an example of a moving vehicle—in this case, an aeroplane 100—provided with an antenna (A) 102. The antenna generates a beam 104, with which it can communicate with a base station (BS) 106 on the ground.

The beam 104 may be steered (rotated) to change the bearing (direction of peak antenna gain) 108, allowing the beam to be directed towards the base station 106. For example, control circuitry (not shown) may steer the beam 104 so that the bearing is roughly in the direction of the base station 106, to improve the link quality of communication between the antenna 102 and the base station 106. To do this, the control circuitry may estimate the direction of the base station 106 relative to the antenna 102, based on an estimated position and orientation of the aircraft 100 and/or the antenna 102, and a known position of the base station 106.

Figure 2:
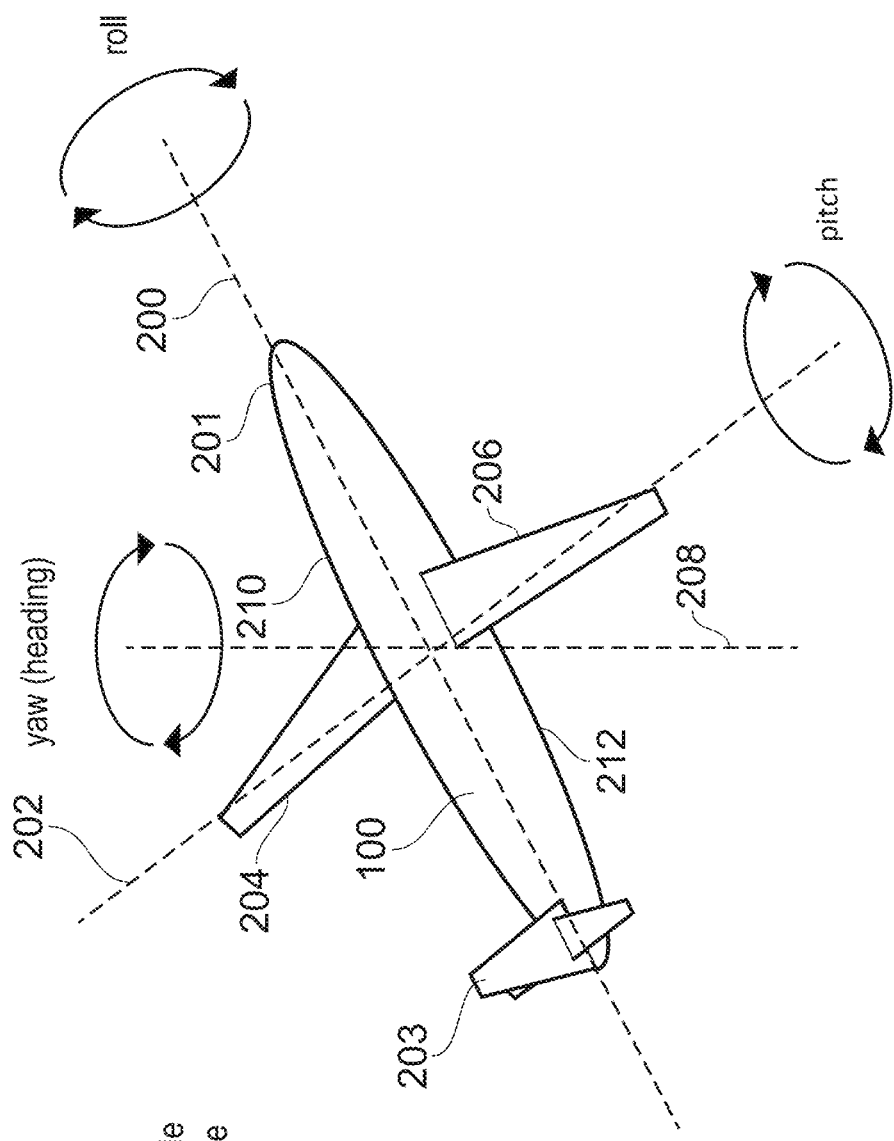
Figure 2:
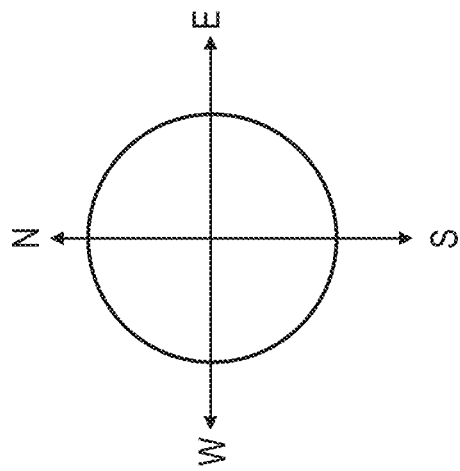

FIG. 2 illustrates some of the ways in which the position and orientation of an aircraft 100 may be measured. The position of an aircraft 100 may be measured in geographic coordinates—e.g. in terms of a longitude (e.g. a number of degrees east or west of the prime meridian in Greenwich, London, UK), a latitude (e.g. number of degrees north or south of the equator), and an altitude (e.g. a distance (height) above the mean sea level). However, it will be appreciated that geographic coordinates are just one example of how the location of the aircraft could be measured.

Together with installation information indicating a position of the antenna 102 relative to the aircraft 100, the position of the aircraft 100 can be used to determine the position of the antenna 102.

As regards the orientation of the aircraft 100, FIG. 2 illustrates three perpendicular axes of rotation. The aircraft can rotate about a first axis 200 running from the nose 201 of the aircraft 100 to the tail 203 of the aircraft 100 (e.g. a roll axis, or nose-to-tail axis), a second axis 202 running across the wings 204, 206 of the aircraft 100 (e.g. a pitch axis, or wing-to-wing axis), and a third axis 208 running from the top 210 of the aircraft 100 to the bottom 212 of the aircraft 100 (a yaw axis, or top-to-bottom axis).

The rotation about the first axis 200 is known as the "roll" of the aircraft 100, and indicates whether one of the wings 204, 206 is closer to the ground than the other. The rotation about the second axis 202 indicates the "pitch" of the aircraft 100 (also sometimes referred to as the "angle of attack" (AOA) for fixed-wing aircraft), and indicates whether (and by how much) the nose 201 is pointing upwards (away from the ground) or downwards (towards the ground). Finally, the rotation about the third axis 208 is known as the "yaw" of the aircraft 100, and indicates how far to the north, south, east or west the nose 201 is pointing. The roll and pitch of the aircraft 100 are sometimes referred to, collectively, as the "attitude" of the aircraft, and can be measured relative to the horizon. For example, a simple attitude indicator may use gyroscopes to determine the roll and pitch of the aircraft, and may show a representation of the horizon, and a representation of the aircraft relative to the horizon. The yaw, meanwhile, can be measured using a compass. The yaw is also sometimes considered to be part of the "attitude" of the aircraft, and more sophisticated devices such as flight director attitude indicators (FDAI), attitude and heading reference systems (AHRS) and attitude (or flight) direction indicators (ADI/FDI) may measure all three of the yaw, pitch and roll of the aircraft 100. It should be noted that the orientation (roll, pitch and yaw) of an aircraft is separate from its direction of motion; due to the effects of (for example) wind, the direction in which the nose of the aircraft is pointing (the yaw) is not necessarily the direction of motion of the aircraft.

Together, the roll, pitch and yaw of the aircraft indicate the orientation of the aircraft and thus, in combination with information indicating the orientation of the antenna 102 relative to the aircraft 100 (which may also be included in the installation information), can be used to determine the orientation of the antenna 102.

Then, based on the calculated position and orientation of the antenna 102, and a known location of the base station 106, the direction of the base station 106 relative to the antenna 102 can be determined. The beam 104 can then be steered in this direction.

However, the calculated position and orientation of the antenna 102 may not always be accurate, which can lead to reduced accuracy in determining a suitable bearing angle of the antenna beam 104. This reduced accuracy in the bearing angle can in turn reduce the link quality of communication with the base station 106, with the effect being particularly noticeable when the antenna beam 104 is narrow.

There are a number of reasons why the calculated position and orientation of the antenna 102 might be inaccurate. For example, the measurements of the orientation and position of the aircraft 100 may be inaccurate due to the motion of the aircraft 100, particularly when the aircraft 100 is accelerating (e.g. changing speed or direction). For example, when the aircraft 100 is banking (turning), the yaw reading might have reduced accuracy—for example, this could be due to some time-averaging applied to the yaw reading (or damping, for example), which can lead to temporarily inaccurate readings when the yaw is changing, especially if the aircraft is banking sharply (e.g. so that the yaw is changing rapidly). In another example, the position determined using GPS signals may become quickly out of date if the aircraft 100 is moving fast, or if the GPS coverage is poor, thus leading to an inaccurate measurement of the position of the aircraft 100.

In addition, errors introduced during installation of the antenna system (e.g. antenna misalignment) may also affect the accuracy of the determination of the position and orientation of the antenna 102, by rendering the installation information (indicating the position and orientation of the antenna 102 relative to the aircraft 100) inaccurate.

Hence, it would be desirable to be able to determine a correction to be applied to the antenna beam 104 to improve the link quality of communication with a base station 106.

Figure 3:
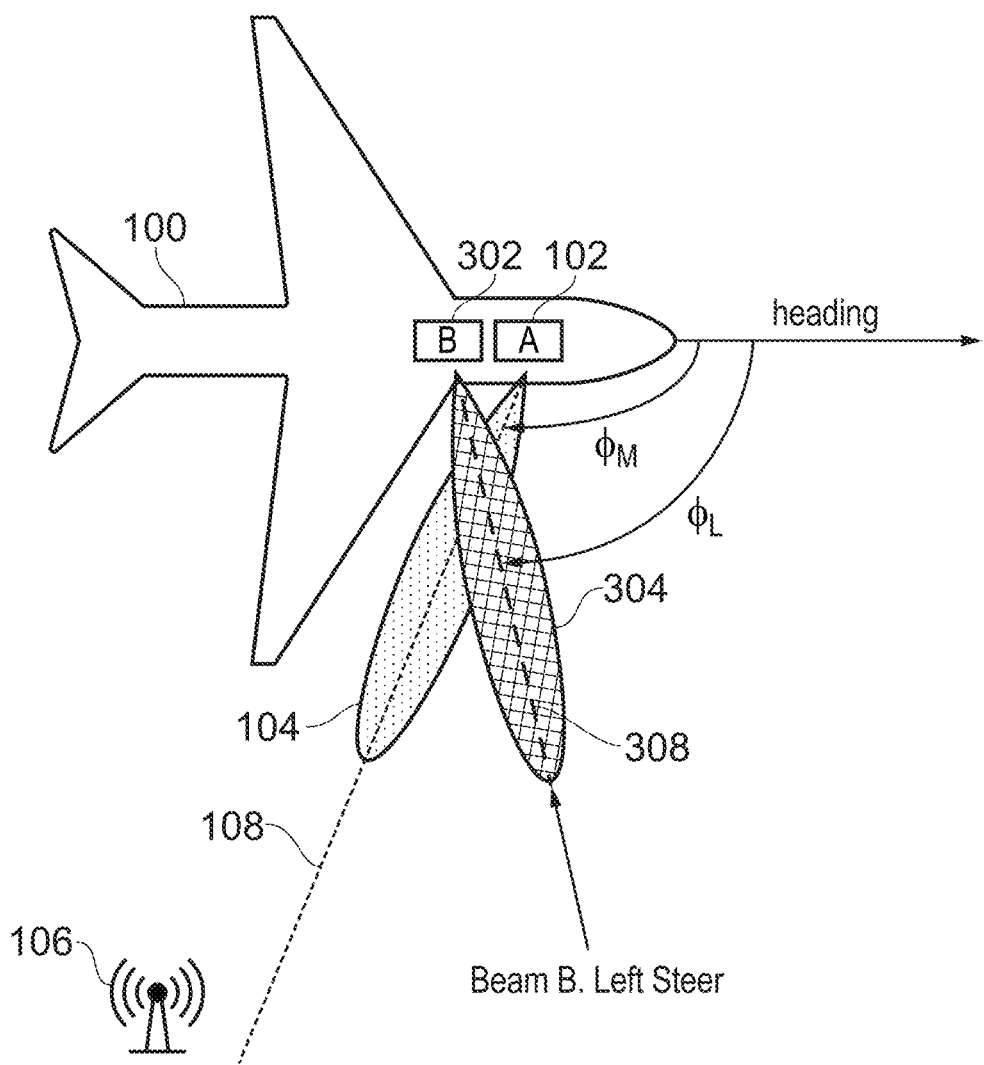
Figure 4:
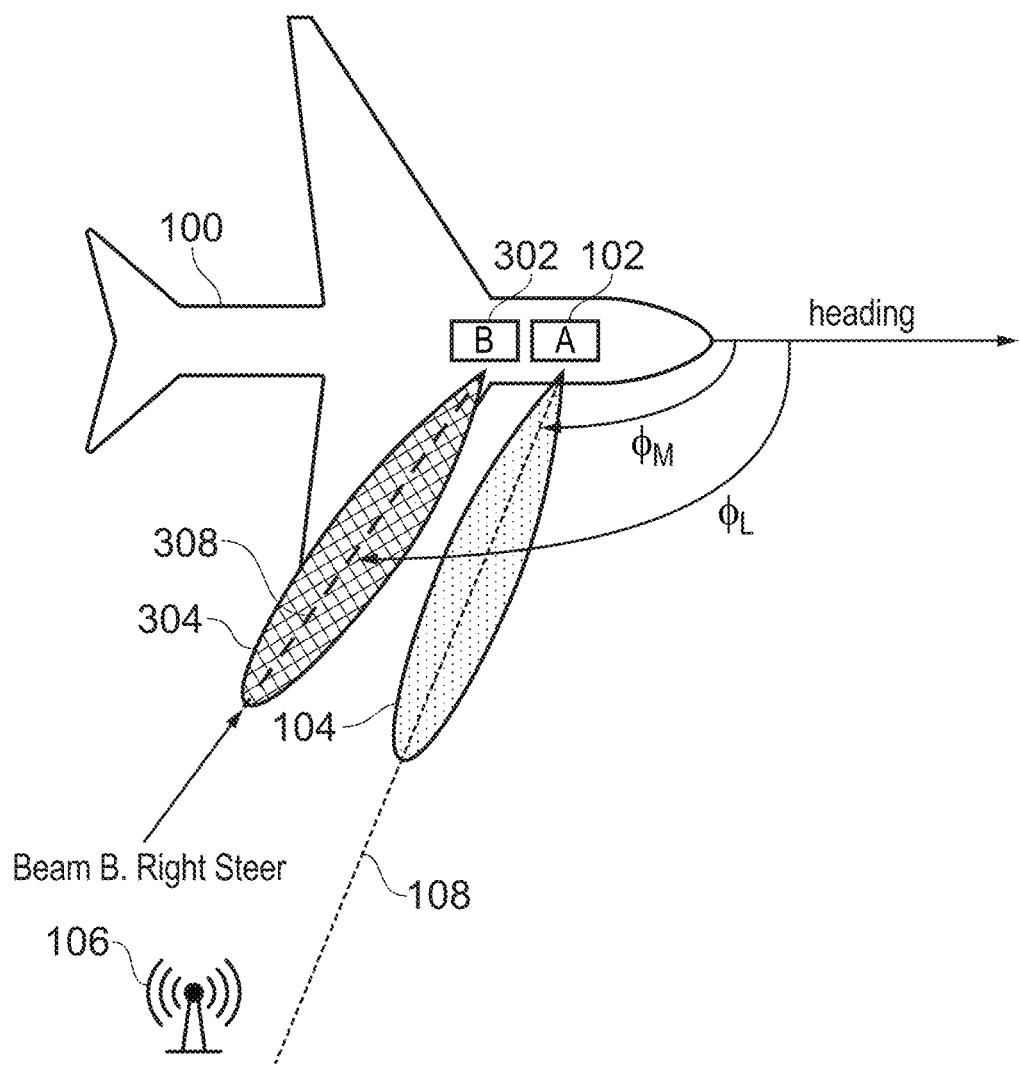
Figure 5:
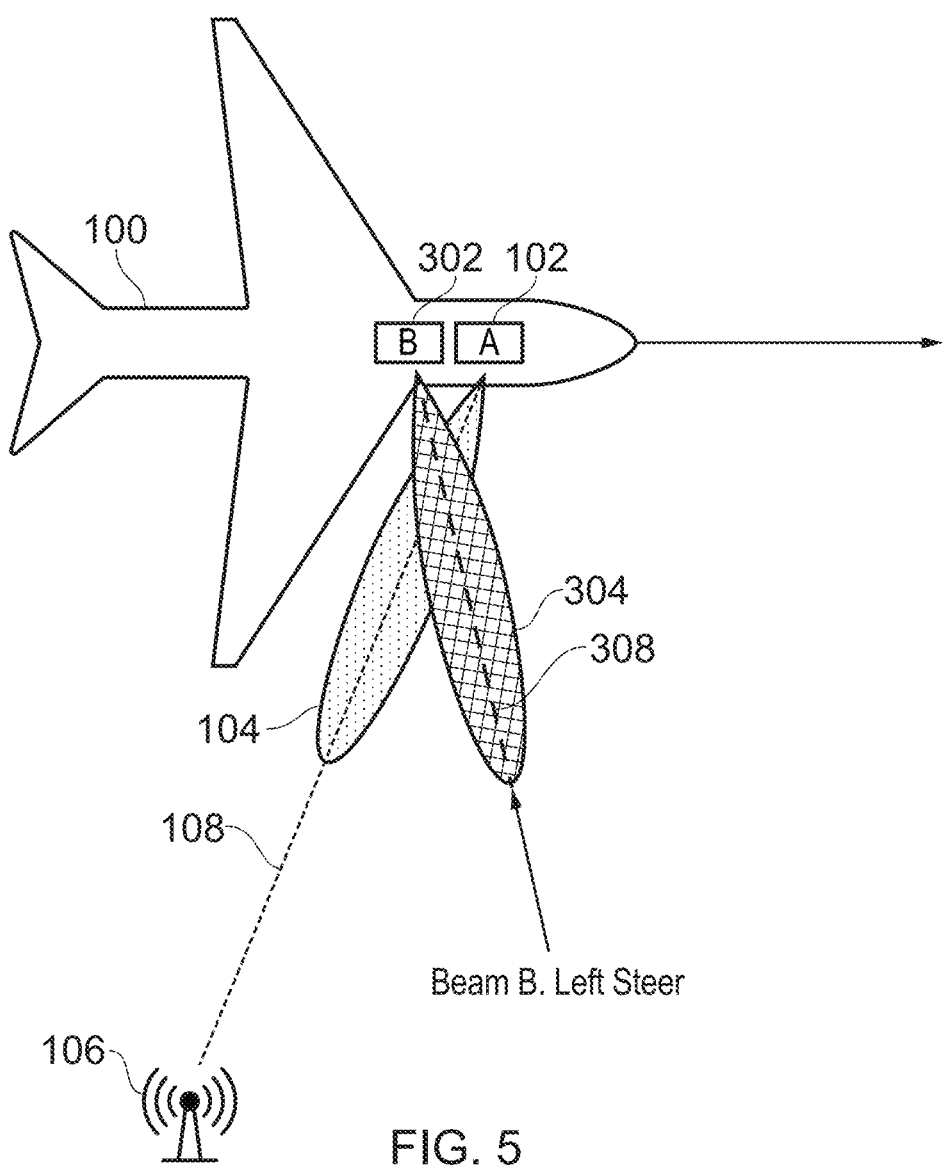

FIGS. 3-5 show how the introduction of a second (measurement) antenna can allow a more accurate bearing angle to be determined for the main antenna. Starting with FIG. 3, an aircraft 100 is illustrated with a main antenna (A) 102 and a measurement antenna (B) 302. The main antenna 102 generates a main beam 104 which is steered to an initial bearing angle of $\phi_M$, roughly in the direction of a base station 106, the initial bearing angle being determined based on the estimated position and orientation of the antenna 102, as discussed above. In this example, the main beam is rotated in a single plane (left and right in this example) and is indicated as an angle relative to the yaw of the aircraft 100. It will be appreciated, however, that the bearing angles of the antenna beams may be measured relative to any plane, provided it is fixed relative to the antenna system.

A measurement beam 304 generated by the measurement antenna 302 can also be rotated, independently of the rotation of the main beam 104, and is steered so that its bearing 308 is at a first measurement angle $\phi_L$. In this case, the measurement beam 304 is steered anticlockwise of the main beam 104 (e.g. to the left, when looking along the bearing 108 of the main beam 104 from the main antenna 102).

The antenna system comprising is then arranged to measure at least one metric related to a signal received from the base station 106 by the measurement antenna 302 with the measurement beam 304 steered to $\phi_L$.

Next, as shown in FIG. 4, the measurement beam 304 is steered to a second measurement angle $\phi_R$ to the opposite side (in this case, clockwise) of the main beam 104 (while the initial bearing angle of the main beam 108 is maintained). The antenna system measures the at least one metric for signals received by the measurement antenna 302 at this updated angle, and compares the value of the at least one metric recorded for each measurement angle. Based on this comparison, the antenna system can (as will be discussed in more detail below) determine a correction to be applied to the bearing angle 108 of the main beam 104.

In this particular example, as shown in FIG. 5, the antenna system applies the correction by steering the main beam clockwise (e.g. to the right), which improves the link quality of communication with the base station 106. The measurement beam 304 can then be steered back to the left (anti-clockwise) of the main beam 104, where the process can begin again. This process can be iterated during the aircraft's flight, allowing the bearing angle of the main beam 104 to be continuously updated. In this way, the main antenna 102 can maintain high-quality communication with the base station 106, even during rapid maneuvering of the aircraft.

In FIGS. 3 to 5, the main antenna 102 is an example of a main antenna to generate a main beam, the measurement antenna 302 is an example of a measurement antenna to generate a measurement beam, the aircraft 100 is an example of a moving vehicle, and the base station 106 is an example of a further antenna system.

Figure 6:
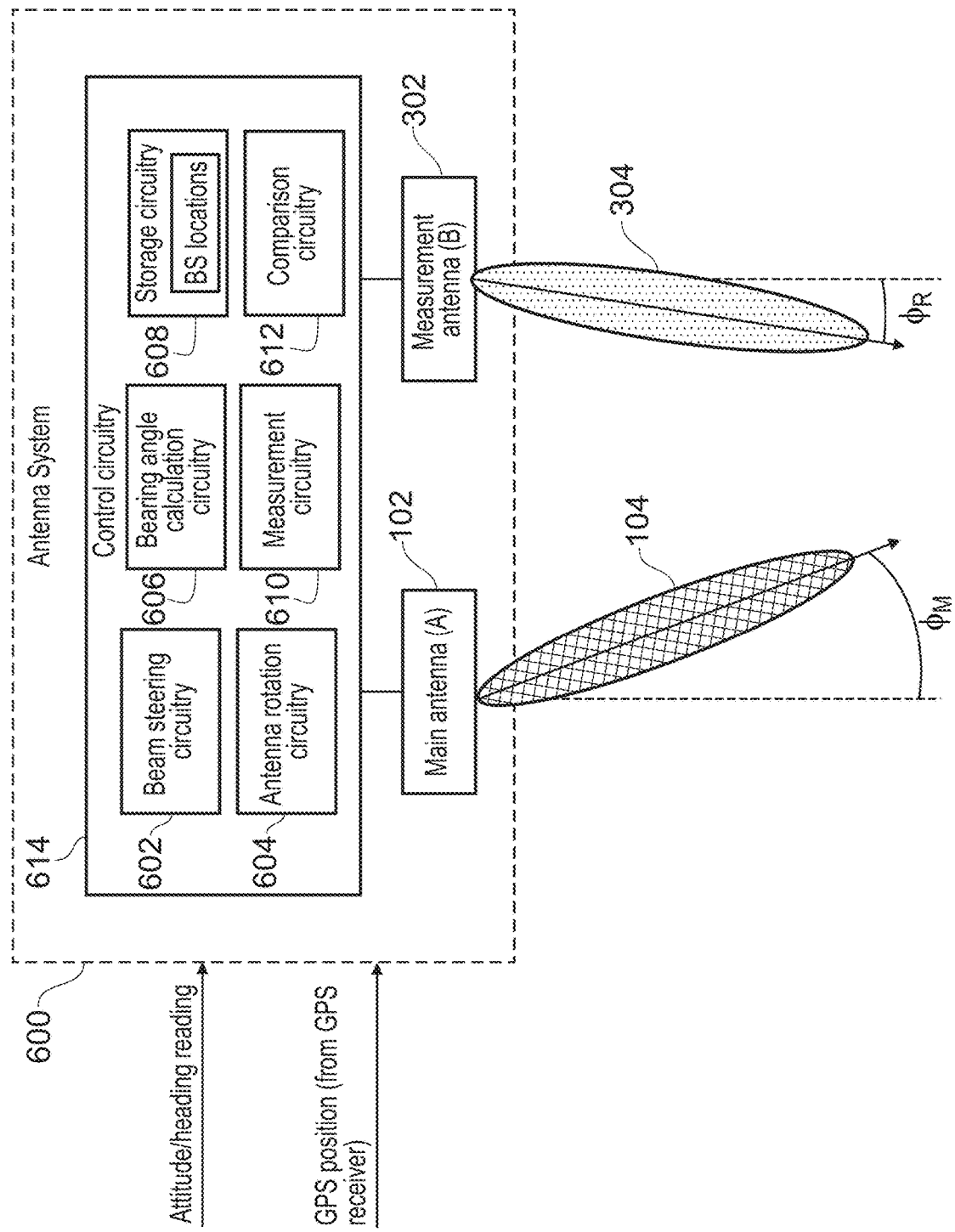

FIG. 6 shows an example of an antenna system 600 which can be installed in a moving vehicle such as the aircraft 100 shown in FIGS. 1-5. As discussed above, the antenna system 600 includes a main antenna 102 to generate a main beam 104 and a measurement antenna 302 to generate a measurement beam 304. The antenna system 600 also includes beam steering circuitry 602 and antenna rotation circuitry 604 to rotate the main beam 104 and measurement beam 304. The beam steering circuitry 602 electronically steers each of antenna beams by changing the shape of the beam, while the antenna rotation circuitry 604 mechanically steers each of the antenna beams by physically rotating the antennas. The main beam 104 and measurement beam 304 are steered independently of one another, and this may be done using a combination of mechanical and electronic steering by the antenna rotation circuitry 604 and beam steering circuitry 602. However, it will be appreciated that this is just one example of a mechanism by which the main beam 104 and measurement beam 304 could be steered. In other examples, only one of the beam steering circuitry 602 and antenna rotation circuitry 604 may be present. As described above with reference to FIGS. 3-5, each of the main beam and the measurement beam may be rotatable in a single plane, or in multiple planes.

As previously described, the main beam 104 is steered to an initial bearing angle $\phi_M$ and the measurement beam 304 is steered to a measurement angle (e.g. $\phi_R$). FIG. 6 shows another example of how the initial bearing angle and the measurement angle may be measured—in this example, the angles are measured with respect to an axis running perpendicular (e.g. normal) to the corresponding antenna.

The antenna system 600 shown in FIG. 6 also includes bearing angle calculation circuitry 606, which determines an initial bearing angle for the main beam 104 on basis of an estimated direction of a base station, determined using:
  position information of the serving base station (read from the storage circuitry 608, which stores information indicating the locations of a plurality of base stations);
  position and orientation information relating to the moving vehicle (in the form of a GPS location received by the antenna system 600 from a GPS receiver, and an attitude and yaw reading); and
  installation information indicative of the position and orientation of the antenna system 600 relative to the moving vehicle.

The antenna system also includes measurement circuitry 610 to measure at least one metric relating to signals received by the measurement antenna 302 when the measurement beam 304 is rotated to each of a pair of position to either side of the initial bearing angle, and comparison circuitry 612 to compare the measurements and generate a comparison output. The bearing angle calculation circuitry 606 then receives the comparison output, and uses it to determine a correction to be applied to the initial bearing angle.

As shown in FIG. 6, the beam steering circuitry 602, antenna rotation circuitry 604, bearing angle calculation circuitry 606, storage circuitry 608, measurement circuitry 610 and comparison circuitry 612 may collectively be known as control circuitry 614, and this is an example of control circuitry to perform an adjustment process. However, it will be appreciated that this is just one example of the arrangement of the control circuitry 614, and other arrangements are also possible. For example, the control circuitry 614 may include more elements than those shown in FIG. 6.

In addition: the storage circuitry 608 is an example of storage circuitry to store, for each of a plurality of further antenna systems, a corresponding recorded position; the beam steering circuitry 602 is an example of beam steering circuitry to electronically steer the main beam by adjusting the shape of the main beam, and to electronically steer the measurement beam by adjusting the shape of the measurement beam; and the antenna rotation circuitry 604 is an example of antenna rotation circuitry to mechanically steer the main beam by rotating the main antenna, and to mechanically steer the measurement beam by rotating the measurement antenna.

Figure 7:
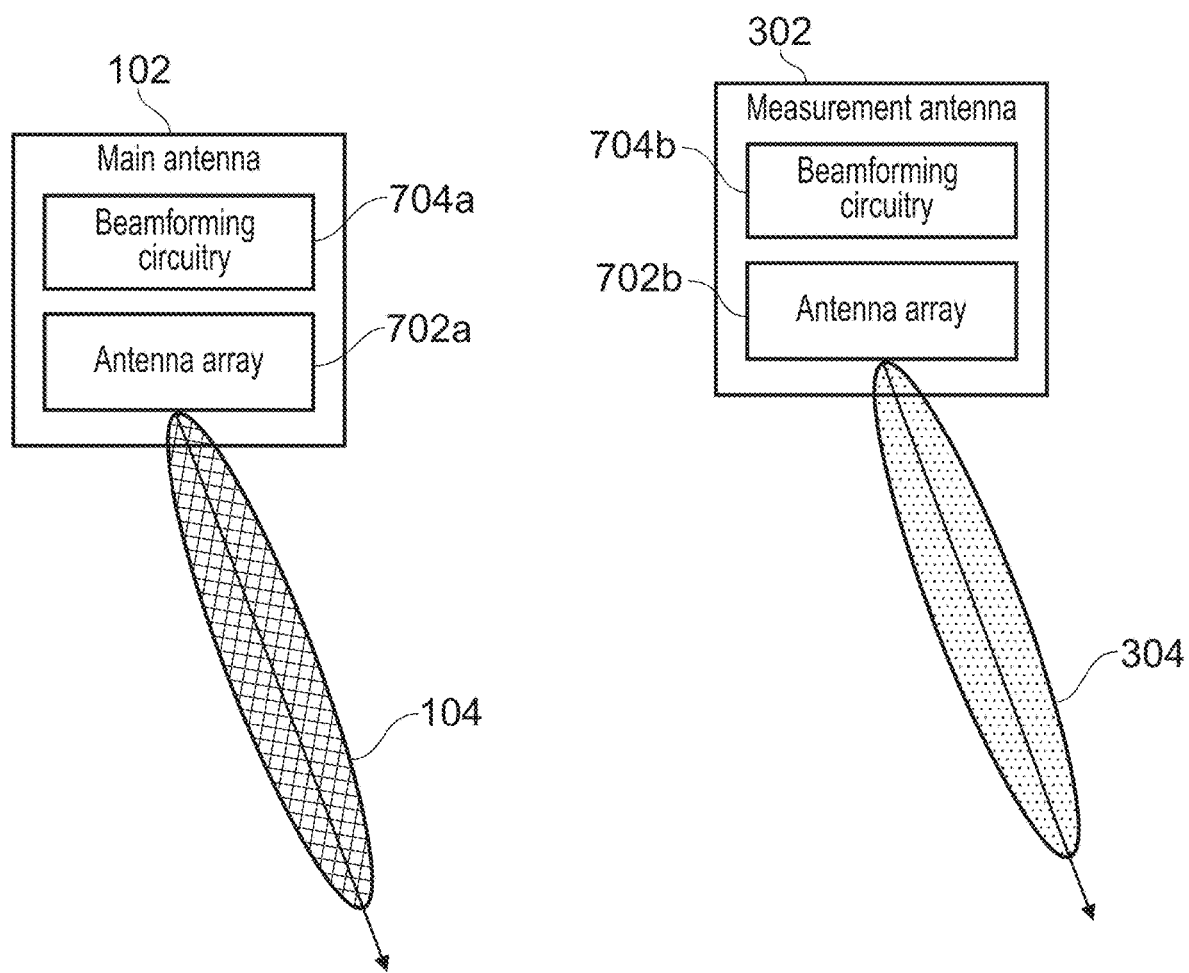

FIG. 7 shows an example arrangement of each of the main antenna 102 and the measurement antenna 302. In this example, each antenna 102, 302 includes an antenna array 702a, 702b and beamforming circuitry 704a, 704b. The beamforming circuitry 704a, 704b is therefore an example of beamforming circuitry to control the antenna array to generate a beam (e.g. the main beam 104 or the measurement beam 304) having a peak antenna array gain in a peak direction.

Figure 8:
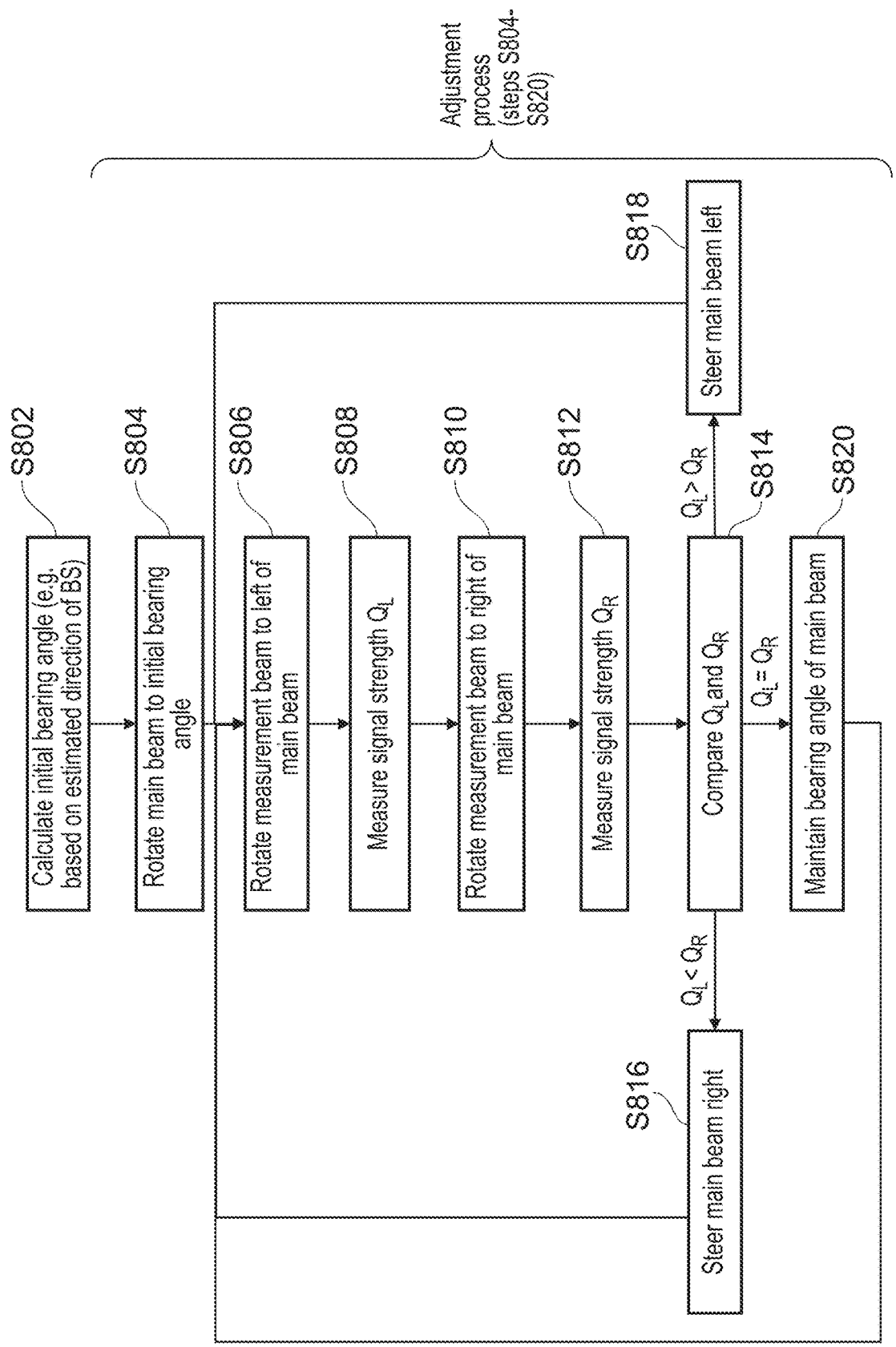

FIG. 8 is a flow diagram showing an example of a method of correcting the bearing angle of the main beam. The method includes a step S802 of calculating the initial bearing angle of the main beam, based on an estimated direction of the base station. For example, this could be based on a known position of the base station (e.g. as recorded in the storage circuitry 608), measurements of the location and orientation of the moving vehicle (e.g. based on attitude and yaw readings, and a GPS signal), and installation information indicating the position and orientation of the antenna system relative to the rest of the moving vehicle.

Once the initial bearing angle has been calculated in step S802, the main beam is rotated S804 to the initial bearing angle. This is the starting point for the adjustment process.

In step S806, the measurement beam is rotated to one side (the left, in this example) of the main beam, and in step S808 the signal strength $Q_L$ of signals received by the measurement beam at that angle is measured. The measurement beam is then rotated S810 to the opposite side (the right, in this example) of the main beam, where the signal strength of received signals $Q_R$ is again measured S812.

Once the signal strength to either side of the initial bearing angle has been measured, the measured values of the signal strength are compared S814. The angle of the main beam is then corrected based on the comparison:

If the signal strength of the signals received to the right of the initial bearing angle is greater than the signal strength of signals received to the left ($Q_R > Q_L$), the main beam is steered S816 to the right. For example, the beam may be steered a predetermined number of degrees to the right, before the method returns to step S806, and the adjustment process repeats.

On the other hand, if the signal strength to the left is stronger than the signal strength to the right ($Q_L > Q_R$), the main beam is steered S818 to the left, before the method returns to step S806.

Finally, if the signal strengths measured to the left and to the right of the main beam are equal ($Q_R = Q_L$), then the angle of the main beam is maintained, and the method returns to step S806.

The adjustment process (S804-S820) is performed iteratively, with step S804 only being included in the first iteration (in subsequent iterations, the initial bearing angle is replaced with the bearing angle as corrected after step S816, S818 or S820). With each iteration of the adjustment process, the bearing angle of the main beam is moved closer to the actual direction of the base station; more specifically, since the signal strength is compared in this method, each iteration of the adjustment process improves the signal strength of communication using the main beam. Thus, the method shown in FIG. 8 allows the antenna system to correct for errors in—for example—the measurements of the position and orientation of the vehicle and/or the antenna system, even while the vehicle is maneuvering, and without interrupting any communication taking place using the main beam.

Figure 9:
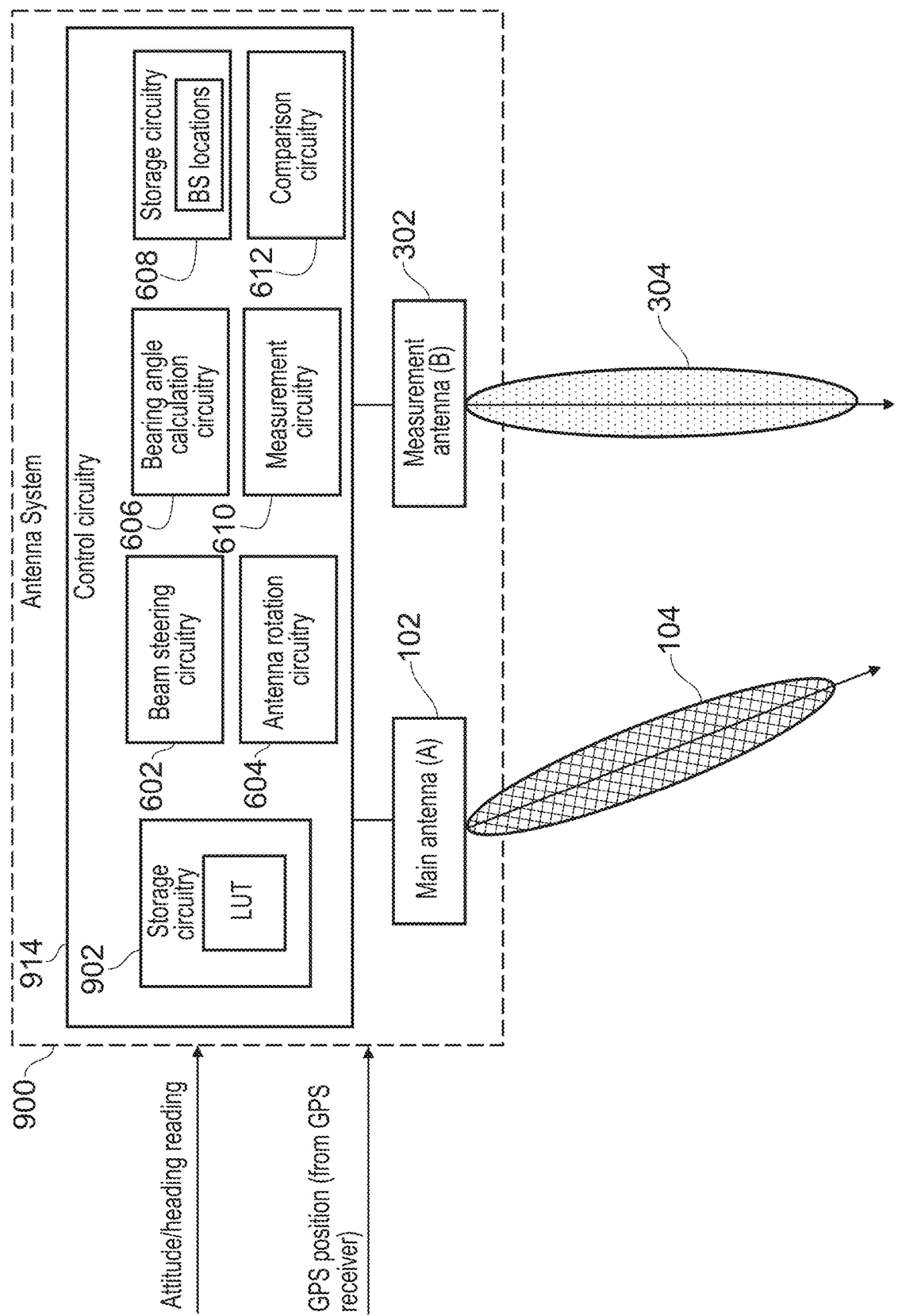

FIG. 8 does not specify the degree of rotation of the measurement beam to either side of the main beam. However, in some examples of the present technique specific measurement angles for the measurement beam may be specified for a set of bearing angles of the main beam. For example, FIG. 9 shows an example of an antenna system 900 of the present technique in which further storage circuitry 902 is provided within the control circuitry 914, to store a look-up table (LUT) recording, for each of a plurality of bearing angles of the main beam 104, a corresponding pair of measurement angles for the measurement beam 304. The antenna rotation circuitry 604 and/or the beam steering circuitry 602 thus rotates the measurement beam 304 to each of the pair of measuring angles indicated in the look-up table for the current bearing angle of the main beam 104 (e.g. the initial bearing angle of the corrected bearing angle after the adjustment process has been performed). Hence, the further storage circuitry 902 is an example of storage circuitry to store a look-up table (LUT) indicating corresponding measurement angles for each of a plurality of bearing angles of the main beam.

Other than the addition of the further storage circuitry 902, the antenna system 900 shown in FIG. 9 is identical to the antenna system shown in FIG. 6. Moreover, in some examples, the look-up table may be stored in the same storage circuitry 608 as the base station locations, in which case the further storage circuitry 902 would not be needed.

The pair of measurement angles stored in the look-up table for each bearing angle of the main beam can be chosen in any of a number of ways, depending on the particular implementation of the present technique—as noted above, any pair of measurement angles will allow the adjustment process to work. However, one way of choosing the measurement angles is illustrated in FIG. 10.

Figure 10:
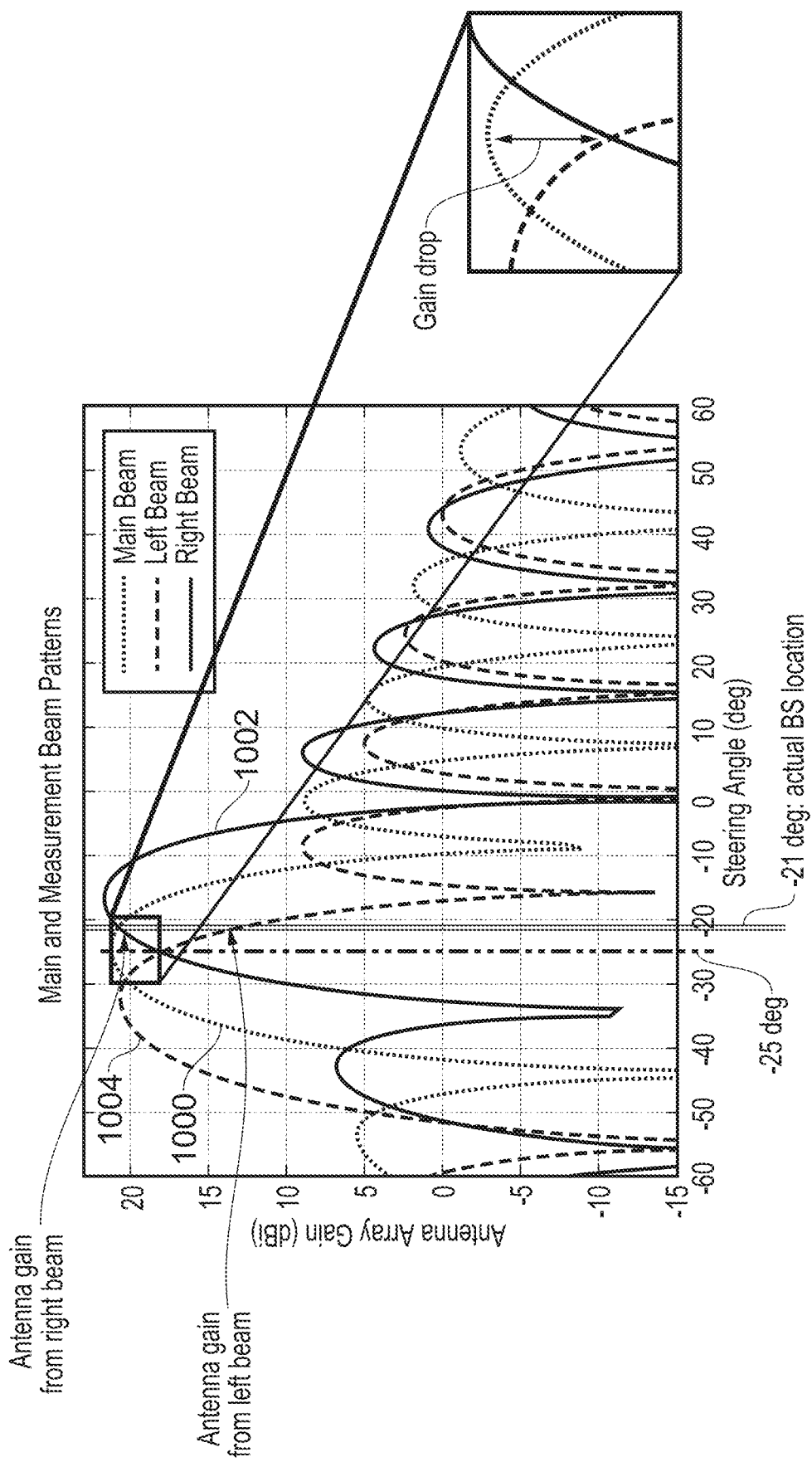
FIG. 10 is a graph showing example gain curves for the main and measurement beams.

FIG. 10 shows three graphs of antenna array gain versus steering angle. Each graph is referred to as a gain curve or beam pattern, and represents the directional (angular) dependence of the strength of signals sent or received by an antenna array gain when steered to a given bearing angle.

The graphs shown include a graph 1000 for a main beam when steered (rotated) to a bearing angle of −25 degrees (e.g. having its peak antenna array gain at an angle of −25 degrees). The graph 1000 for the main beam illustrates a beam pattern with a main lobe (peak) centred on −25 degrees on the axis, and several side lobes to either side of the main lobe. Also shown on the same set of axes are graphs for the measurement beam when steered to each of a pair of measurement angles corresponding to the bearing angle of the main beam. In particular, one graph 1002 shows the beam pattern for the measurement beam when steered to around −18 degrees (to the right of the main beam), and the other graph 1004 shows the beam pattern of the measurement beam when steered to around −32 degrees (to the left of the main beam). The beam patterns 1002, 1004 for the measurement beam at each measurement angle have a similar shape to the beam pattern 1000 for the main beam, with a main lobe centred on the measurement angle, and side lobes to either side of the main lobe.

In this example, the measurement angles chosen for the measurement beam are such that the main lobes of the gain curves 1002, 1004 for the left and right measurement angles intersect directly below the peak of the main lobe of the gain curve 1000 for the main beam (e.g. they intersect at −25 degrees, with an antenna array gain slightly below the antenna array gain of the main beam at that angle). As shown in FIG. 10, the difference in antenna array gain between the peak of the gain curve for the main beam 1000 and the point at which the two gain curves for the measurement beam intersect is known as the "gain drop".

Because the main lobes of the gain curves for the two measurement beams intersect directly below the main lobe of the gain curve for the main beam, the inventors of the present technique realised that the difference between the antenna array gain of the measurement beam at each of the measurement angles can be used to determine whether the bearing angle of the main beam is correct. In particular, with the point of intersection positioned directly below the peak of the main lobe for the main beam, the antenna array gain of the measurement beam at each measurement angle will be equal when the main beam is steered to the correct (preferred) bearing angle. For this reason, selecting the measurement angles in this way—so that the main lobes of the gain curves for each measurement angle intersect directly below the peak of the antenna array curve for the main beam—can be particularly advantageous.

For example, if the bearing angle for the main beam had been correct (i.e. the true BS direction is at −25 degrees), then the gain curves for the measurement angle to the left and the right of the main beam would have the same antenna array gain. On the other hand, in the example shown in FIG. 10, when the BS direction is at −21 degrees, the antenna array gain for the measurement beam is lower to for the measurement angle to the left of the main beam than for the measurement angle to the right. This indicates that the main beam is currently rotated too far to the left, and should be steered towards the right to improve the antenna array gain.

Figure 11:
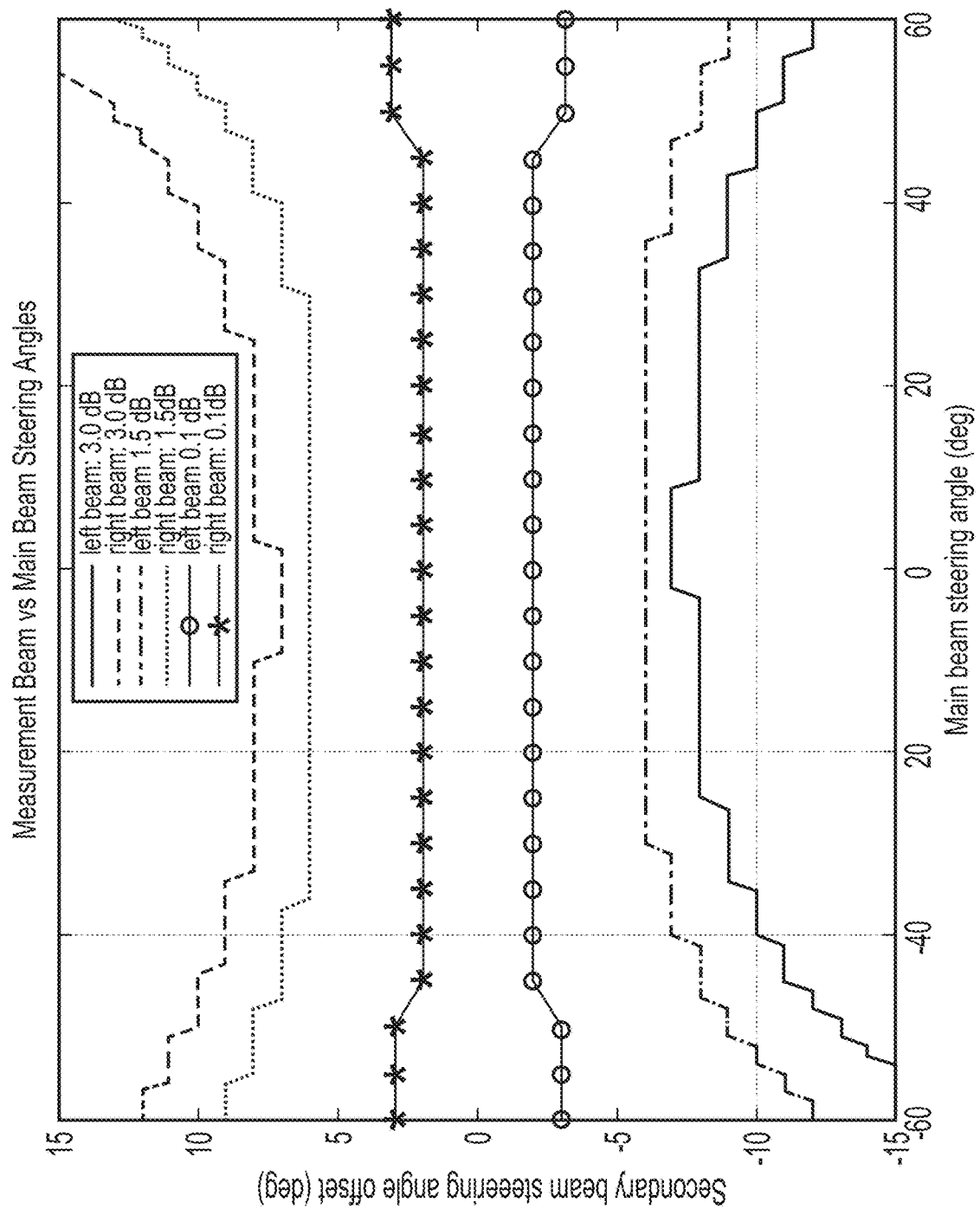
FIG. 11 is a graph showing examples of measurement angles corresponding to different bearing angles of the main beam for different gain drops.

FIG. 11 is a graph illustrating examples of measurement angles that may be chosen for particular main beam angles—in particular, the x-axis shows the main beam bearing angle ("main beam steering angle"), while the y-axis shows the offset (difference) between the measurement angles chosen for that bearing angle and the bearing angle itself ("secondary beam steering angle offset"). The graph also shows how the offset affects the gain drop.

For example, FIG. 11 shows that as the offset between the bearing angle and the measurement angle of the right beam is increased, the gain drop increases. Similarly, as the offset between the bearing angle and the left measurement decreases (e.g. becomes more negative), the gain drop increases. Stated differently, as the gain drop is increased, the offset between the bearing angle and the measurement angles (left and right) also increases.

Hence, as shown in FIG. 11, given a predefined gain drop, the pair of measurement angles for each bearing angles can be selected.

Figure 12:
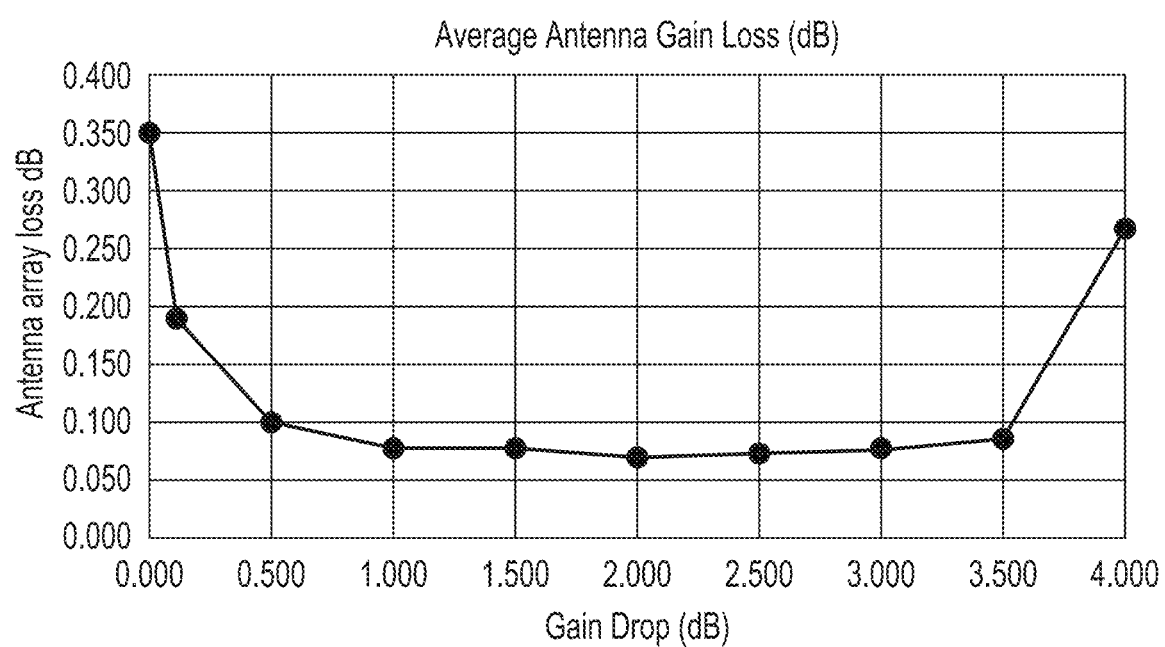
FIG. 12 is a graph illustrating the effect of different gain drops on antenna array loss.

FIG. 12 illustrates the effect of the gain drop on antenna array loss of the main beam (relative to an optimal beam pointing in the direction of the base station) for an example antenna array. As shown in the graph, there is a range of gain drops (in this case, from around 0.5 dB to around 3.5 dB) for which the antenna array loss is lower. Hence, selecting a gain drop within this range would allow the antenna array loss to be reduced.

On the other hand, a larger gain drop may also be advantageous, since it may allow the difference in signal strengths (or whatever other metric is chosen) between the signals received at each of the pair of measurement angles to be clearer (and thus easier to calculate accurately). Hence, choosing measurement angles which provide a greater gain drop can improve the accuracy of the adjustment process.

Therefore, there is a trade-off between increasing the gain drop to improve the accuracy of the process, and keeping the gain drop within a given range to reduce the antenna array loss. Hence, one might—for example—choose a gain drop towards the upper limit of the given range. For example, for an antenna system with a relationship between the antenna array loss and the gain drop matching that shown in FIG. 12, one might choose a gain drop between 2.5 dB and 3.5 dB. However, it will be appreciated that this is just an example, and other values may be chosen for the gain drop. Moreover, it will be appreciated that a given gain drop may be provided by different measurement angles in antenna arrays with different arrangements. Hence, the measurement angles for a given bearing angle of the main beam may depend not only on the desired gain drop, but also on other factors such as the specific arrangement of the antenna array.

Figure 13:
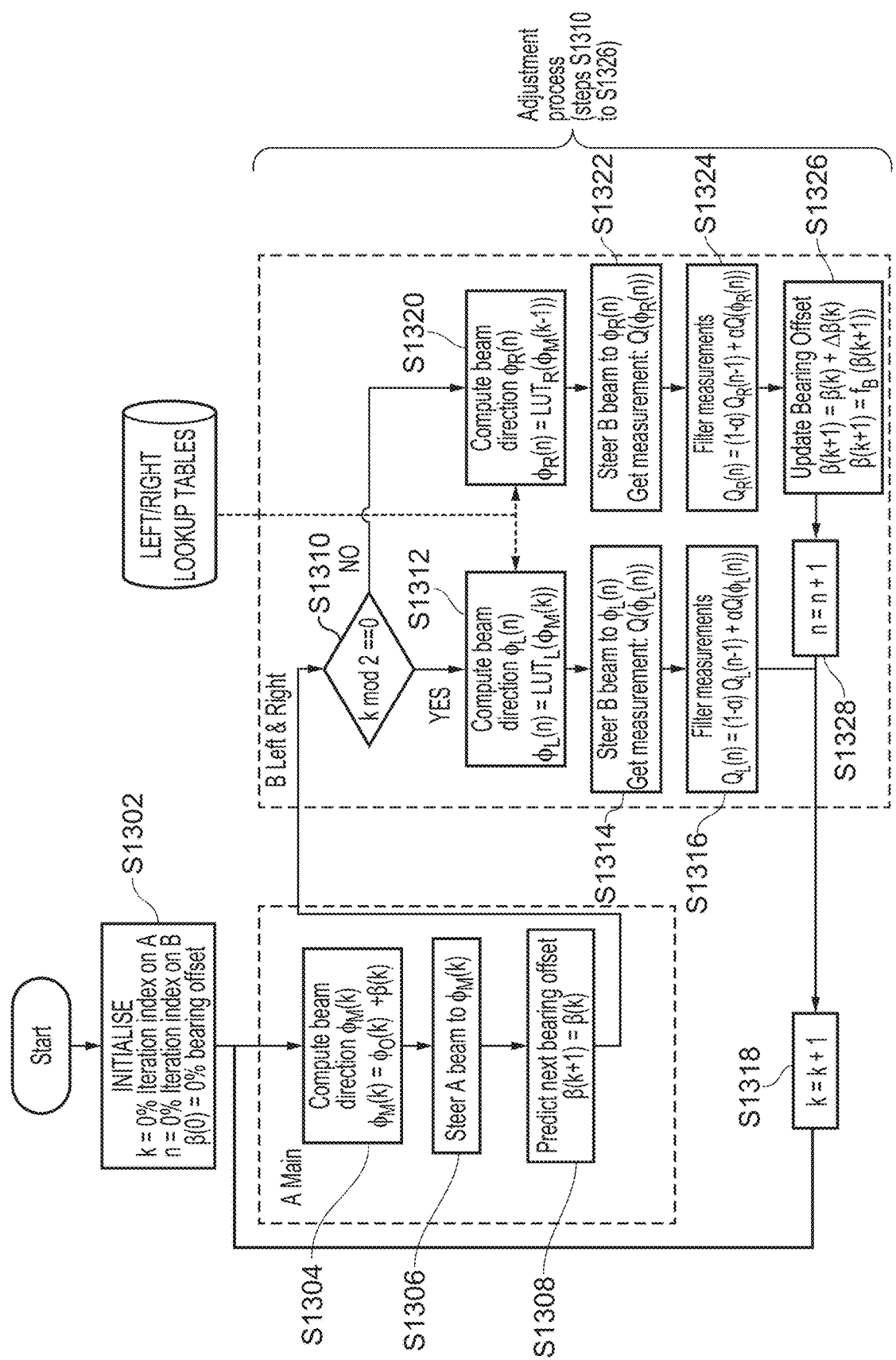
FIG. 13 is a flow diagram showing a method for correcting the bearing angle of the main beam.

Turning now to FIG. 13, this is a flow diagram showing an example of a method for correcting the bearing angle of the main antenna which uses a look-up table (LUT).

The method comprises a step S1302 of initialising a set of parameters to be used in the rest of the method. In particular, the following parameters are set:

k (the iteration index for the main beam) is initialised to zero (0);
n (the iteration index for the measurement beam) is initialised to zero (0); and
$\beta(k)$ (the bearing offset/correction amount to be added to the initial bearing angle of the main beam) is initialised to $\beta(0)=0$.

Once the parameters have been initialised, the adjustment process begins.

In the adjustment process, the bearing angle (beam direction) of the main beam is calculated S1304. In particular, the bearing angle of the main beam, $\phi_M(k)$, is set to $\phi_0(k)+\beta(k)$, where $\phi_0(k)$ is the initial bearing angle of the main beam (recalculated each time k is incremented), calculated based on the estimated position and orientation of the antenna system. The beam is then steered S1306 to $\phi_M(k)$, and the next bearing offset $\beta(k+1)$ is predicted S1308—in particular, it is predicted that $\beta(k+1)$ will equal $\beta(k)$.

In a step S1310, the method includes determining whether k mod 2 (k modulo 2, also written k % 2 returns the remainder of the division k÷2) equal to zero. This is essentially a way of determining whether k is even or odd: if k mod 2=0, then the value of k is even, and if k mod 2 is does not equal to zero, then the value of k is odd.

If k mod 2==0 (e.g. the "YES" branch of the flow diagram), the beam will be steered to the left, and the beam direction for the measurement beam is calculated S1312 by searching the left-beam look-up table ($LUT_L$) for the measurement angle $\phi_L(n)$ corresponding with $\phi_M(k)$. In step S1314, the measurement beam is then steered to $\phi_L(n)$ and a measurement of the signal strength $Q(\phi_L(n))$ is made. A filter is then applied S1316 to the measured signal strength to remove some of the noise from the measurement. In particular, the filer is applied according to the following equation:

$$Q_L(n)=(1-\alpha)Q_L(n-1)+\alpha Q(\phi_L(n)) \qquad (1)$$

where $\alpha$ is a filtering coefficient, indicating a weighting between past and current measurements of the signal strength. In the first iteration (n=0), the value of $Q_L(-1)$ is set to $Q(\phi_L(0))$, so that the value of $Q_L(0)=Q(\phi_L(0))$. It will be appreciated that the filter is not essential—the method of FIG. 13 can also be implemented without filtering the signal strength at steps S1316 and S1324. However, filtering the signal strength can allow a more accurate determination to be made of the correction to be applied to the main beam.

The value of k is then incremented S1318 by 1, before the steps S1304 to S1308 of adjusting the angle of the main beam are performed again. It should be noted that when k is updated to an odd value in step S1318 (following step S1316), the value of $\beta(\kappa)$ remains the same as for the previous iteration of steps S1304 to S1308. For example, $\beta(0)=\beta(1)=0$, so $\phi_M(1)=\phi_0(1)$.

Returning to step S1310, if k mod 2=/=0 (e.g. if k is odd—the "NO" branch), the beam direction $\phi_R(n)$ for the measurement beam is computed in step S1320 by searching the right-beam lookup table ($LUT_R$) for the angle corresponding with $\phi_M(k-1)$. In a step S1322, the measurement beam is then steered to $\phi_R(n)$, and the signal strength $Q(\phi_R(n))$ is measured. The signal strength is then filtered S1324 in the same way as in step S1316; in particular, the signal strength is filtered using the following equation:

$$Q_R(n)=(1-\alpha)Q_R(n-1)+\alpha Q(\phi_R(n)) \qquad (2)$$

Note that this is the same as equation 1, except that it refers to $\phi_R(n)$ and $Q_R$ instead of $\phi L(n)$ and $Q_L$.

The filtered signal strengths for the left and right beams—$Q_R$ and $Q_L$—are then used to calculate S1326 an updated bearing offset $\beta(k+1)$. The values of n and k are then incremented S1328, S1318, and the process repeats from step S1304.

The updated bearing offset $\beta(k+1)$ is calculated by determining a value $\Delta\beta(k)$ using the values of $Q_R$ and $Q_L$. This value can be determined in any of a number of ways, but one example could be to set the magnitude of $\Delta\beta(k)$ to a predetermined amount (e.g. a set number of degrees, such as 1 degree), and set the sign of $\Delta\beta(k)$ dependent on whether $Q_R$ and $Q_L$ is greater. This is similar to the approach in FIG. 8. Alternatively, both the sign and the magnitude of $\Delta\beta(k)$ may be calculated using $Q_R$ and $Q_L$, as will be discussed below.

A function $f_B$ may then be applied to the calculated value of $\beta(k+1)$; for example, the function $f_B$ may adjust $\beta(k+1)$ to make sure it is within certain pre-determined bounds, to prevent the bearing offset from becoming too large—this will also be discussed below.

As mentioned above, the magnitude and direction of the correction to be applied to the bearing angle of the main beam may be determined using the (optionally filtered) signal qualities of the signals received by the measurement beam at positions to the left and to the right of the main beam. One way of doing this may be to use PID control circuitry. For example, FIG. 14 shows an example of an antenna system 1400 comprising PID control circuitry 1402 within the control circuitry 1414. The other components in the antenna system 1400 are identical to those shown in FIG. 9.

The PID control circuitry 1402 is an example of proportional-integral-derivative (PID) control circuitry to calculate the correction, and is arranged to calculate the correction to be applied to the bearing angle of the main beam using a PID (proportional-integral-derivative) approach, such as the approach illustrated in FIG. 15.

FIG. 15 shows a method of computing $\Delta\beta(k)$ using PID control circuitry 1402. The method begins with a step S1502 of initialising a set of parameters to be used in the method. In particular, the following parameters are set:

L (the length of the buffer, B, storing past values of the error $(Q_R-Q_L)$);

$C_P$, $C_I$ and $C_D$ constants for use in calculating the proportional, integral and derivative terms respectively); and $P_{MAX}$ (an upper bound for the P, I and D terms (with the lower bound being given by $-P_{MAX}$)).

The PID control circuitry also obtains the calculated values of $Q_L$ S1504 and $Q_R$ S1506, and uses these to calculate S1508 the current error (err), defined as:

$$err=Q_R-Q_L \quad (3)$$

The buffer (B) is then updated S1510 with the current error term. The oldest is discarded.

In step S1512, the proportional (P) term is calculated according to:

$$P=C_p err=C_P(Q_R-Q_L) \quad (4)$$

The PID control circuitry then checks S1514 whether the calculated P term is greater than an upper bound $(P_{MAX})$—setting, at step S1516, $P=P_{MAX}$ if so—and checks S1518 whether the calculated P term is less than a lower bound $(-P_{MAX})$—setting, at step S1520, $P=-P_{MAX}$ if so. Accordingly, the P term (after the adjustment shown in steps S1514 to S1520) can be defined as:

$$P_{adjusted} = \begin{cases} P_{LOW}, & C_P(Q_R-Q_L) < P_{LOW} \\ C_P(Q_R-Q_L), & P_{LOW} \le C_P(Q_R-Q_L) \le P_{HIGH} \\ P_{HIGH}, & C_P(Q_R-Q_L) > P_{HIGH} \end{cases} \quad (5)$$

where $P_{LOW}$ and $P_{HIGH}$ are the lower and upper bounds respectively. The upper and lower bounds can be set to any value, but in the specific example shown in FIG. 15 $P_{HIGH}=P_{MAX}$, and $P_{LOW}=P_{HIGH}=-P_{MAX}$.

In step S1522, the PID control circuitry calculates the integral (I) term according to:

$$I=C_I \text{sum}(B) \quad (6)$$

Eq. (6) indicates that the entries of the buffer are added and the sum is then multiplied by the integral term constant $C_I$.

As with the P term, it is checked S1524 whether the I term is above an upper bound $(P_{MAX})$, and checked S1528 whether the I term is below a lower bound $(-P_{MAX})$. If the I term is outside of the range identified by the upper and lower bounds, it is set S1526, S1530 to the value of the closest of the upper and lower bounds (e.g. if $I > P_{MAX}$, I is set to $P_{MAX}$; and if $I < -P_{MAX}$, I is set to $-P_{MAX}$). Accordingly, the I term (after the adjustment shown in steps S1524 to S1530) can be defined as:

$$I_{adjusted} = \begin{cases} I_{LOW}, & C_I \text{sum}(B) < I_{LOW} \\ C_I \text{sum}(B), & I_{LOW} \le C_I \text{sum}(B) \le I_{HIGH} \\ I_{HIGH}, & C_I \text{sum}(B) > I_{HIGH} \end{cases} \quad (7)$$

where $I_{LOW}$ and $I_{HIGH}$ are the lower and upper bounds respectively. The upper and lower bounds can be set to any value, but in the specific example shown in FIG. 15 $I_{HIGH}=P_{MAX}$, and $I_{LOW}=I_{HIGH}=P_{MAX}$.

In step S1532, the derivative (D) term is calculated according to:

$$D=C_D \text{sum}(-\text{diff}(B)) \quad (8)$$

As with the P term and the I term, it is checked S1534, S1538 whether the D term is outside of the range $-P_{MAX}<=D<=P_{MAX}$. If the D term is outside of the range identified by the upper and lower bounds, it is set S1536, S1540 to the value of the closest of the upper and lower bounds. Accordingly, the D term (after the adjustment shown in steps S1534 to S1540) can be defined as:

$$D_{adjusted} = \begin{cases} D_{LOW}, & C_D \text{sum}(-\text{diff}(B)) < D_{LOW} \\ C_D \text{sum}(-\text{diff}(B)), & D_{LOW} \le C_D \text{sum}(-\text{diff}(B)) \le D_{HIGH} \\ D_{HIGH}, & C_D \text{sum}(-\text{diff}(B)) > D_{HIGH} \end{cases} \quad (9)$$

where $D_{LOW}$ and $D_{HIGH}$ are the lower and upper bounds respectively. The upper and lower bounds can be set to any value, but in the specific example shown in FIG. 15 $D_{HIGH}=P_{MAX}$, and $D_{LOW}=-D_{HIGH}=-P_{MAX}$.

While the flow diagram shows the P, I and D terms being calculated in a particular order, it should be appreciated that these terms are not dependent on one another, and so can be calculated in any order. Regardless of the order in which they are calculated, once the P, I and D terms have been determined, the PID control circuitry sums S1542 the three terms to give the value of $\Delta\beta$. In particular, $\Delta\beta$ is calculated according to the equation:

$$\Delta\beta=P_{adjusted}+I_{adjusted}+D_{adjusted} \quad (10)$$

The value of $\Delta\beta$ can then be used to calculate a value for the offset $\beta$. In particular, as shown in step S1326 of FIG. 13, the offset can be calculated as:

$$\beta(k+1)=\beta(k)+\Delta\beta(k) \quad (11)$$

As explained above (and as shown in step S1326 of FIG. 13), a function $f_B$ can then be applied to the value of the offset, according to:

$$\beta(k+1)=f_B(\beta(k+1)) \quad (12)$$

FIG. 16 is a flow diagram illustrating how a function $f_B$ may be applied. In particular, the method of FIG. 16 includes a step S1602 of initialising the parameter $B_{MAX}$ (the magnitude of the upper and lower bounds for the bearing offset $\beta$). The method also includes obtaining S1604 (e.g. from the PID control circuitry) the bearing offset $\beta(k+1)$, and checking S1606 whether β(k+1) is greater than the upper bound $B_{MAX}$. If the bearing offset is greater than the upper bound, it is adjusted S1608 to β(k+1)=$B_{MAX}$.

The method also includes checking S1610 whether β(k+1) is less than the lower bound −$B_{MAX}$. If β(k+1) is less than the lower bound, it is adjusted S1612 to β(k+1)=−$B_{MAX}$.

Therefore, the function $f_B$ can be represented as follows:

$$f_B(\beta(k+1)) = \begin{cases} B_{MIN}, & \beta(k+1) < B_{MIN} \\ \beta(k+1), & B_{MIN} \leq \beta(k+1) \leq B_{MAX} \\ B_{MAX}, & \beta(k+1) > B_{MAX} \end{cases} \quad (13)$$

where, in the example of FIG. 16, $B_{MIN}$=−$B_{MAX}$. However, it will be appreciated that different values for $B_{MIN}$ and $B_{MAX}$ could be chosen instead. By applying the function $f_B$, the adjustment to the bearing angle of the main beam at each iteration is kept within predetermined limits, stabilizing the main beam (e.g. by preventing it from significant variation over a short space of time).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An antenna system for a moving vehicle, the antenna system comprising:
a main antenna to generate a main beam;
a measurement antenna to generate a measurement beam; and
control circuitry to perform an adjustment process by:
rotating the main beam to an initial bearing angle;
rotating the measurement beam independently of the main beam to receive signals at positions to either side of the initial bearing angle;
comparing at least one metric measured for the signals received by the measurement antenna at the positions to either side of the initial bearing angle to generate a comparison output; and
determining, based on the comparison output, a correction to be applied to the initial bearing angle of the main beam.

2. The antenna system of claim 1, wherein:
the antenna system is configured to communicate with a further antenna system using the main beam; and
the control circuitry is configured to calculate the initial bearing angle in dependence on an estimated direction of the further antenna system relative to the antenna system.

3. The antenna system of claim 2, wherein
the estimated direction is based on a recorded position of the further antenna system and at least one of:
an estimated position of the antenna system; and
an estimated orientation of the antenna system.

4. The antenna system of claim 3, wherein
the control circuitry is configured to calculate the estimated position of the antenna system based on at least one of:
satellite positioning data indicative of a location of the moving vehicle; and
information indicating a position of the antenna system relative to the moving vehicle.

5. The antenna system of claim 3, wherein
the control circuitry is configured to calculate the estimated orientation of the antenna system based on at least one of:
a direction reading indicative of a rotation of the moving vehicle in at least one plane; and
information indicating an orientation of the antenna system relative to the moving vehicle.

6. The antenna system of claim 3, comprising
storage circuitry to store, for each of a plurality of further antenna systems, a corresponding recorded position,
wherein the control circuitry is configured to receive, from the storage circuitry, the recorded position of the further antenna system prior to calculating the initial bearing angle.

7. The antenna system of claim 2, wherein
the antenna system is configured to communicate with the further antenna system using both the main beam and the measurement beam.

8. The antenna system of claim 1, wherein:
the control circuitry is configured to perform a plurality of iterations of the adjustment process;
in each iteration, the control circuitry is configured to determine a corrected bearing angle by applying the correction to the initial bearing angle specified for that iteration; and
for each iteration after the first iteration, the initial bearing angle comprises the corrected bearing angle determined in the preceding iteration.

9. The antenna system of claim 1, wherein
the at least one metric comprises a measure of a signal strength of the signals received by the measurement antenna at the positions to either side of the initial bearing angle.

10. The antenna system of claim 9, wherein
the measure of the signal strength comprises a measure of Reference Signals Received Power (RSRP).

11. The antenna system of claim 9, wherein
the measure of the signal strength comprises a filtered signal strength of the signals received by the measurement antenna at the positions to either side of the initial bearing angle.

12. The antenna system of claim 9, wherein:
the control circuitry is configured to compare the measure of the signal strength of the signals received by the measurement antenna at the positions to either side of the initial bearing angle to determine which of the positions provides a greater signal strength; and
the control circuitry is configured to calculate the correction to, when the correction is applied to the initial bearing angle of the main beam, steer the main beam towards a position providing the greater signal strength.

13. The antenna system of claim 12, wherein
the control circuitry is configured to apply the correction by rotating the main beam from the initial bearing angle by a predetermined amount, in a direction indicated by the correction.

14. The antenna system of claim 1, wherein
the control circuitry comprises proportional-integral-derivative (PID) control circuitry to calculate the correction.

15. The antenna system of claim 14, wherein:
the PID control circuitry is configured to calculate the correction on the basis of an error defined as a difference between values of the at least one metric measured for the signals received by the measurement antenna at the positions to either side of the initial bearing angle; and the PID control circuitry is configured to calculate the correction by summing a proportional term (P) proportional to a current value of an error, an integral term (I) proportional to an integral of past values of the error over time, and a derivative term (D) proportional to a current rate of change of the error.

16. The antenna system of claim 1, wherein:

the control circuitry is configured to compare the correction to an upper threshold value and a lower threshold value;

when the correction has a value greater than the upper threshold value, the control circuitry is configured to update the correction to the upper threshold value; and when the correction has a value less than the lower threshold value, the control circuitry is configured to update the correction to the lower threshold value.

17. The antenna system of claim 1, wherein:

each of the main antenna and the measurement antenna comprises an antenna array, and beamforming circuitry to control the antenna array to generate a beam having a peak antenna array gain in a peak direction;

the control circuitry is configured to rotate the main beam by adjusting the peak direction of the main beam, wherein the main beam is rotated to the initial bearing angle when the peak direction is at the initial bearing angle; and the control circuitry is configured to rotate the measurement beam to a measurement angle by adjusting the peak direction of the measurement beam to be at the measurement angle.

18. The antenna system of claim 17, wherein
the control circuitry comprises at least one of:
antenna rotation circuitry to mechanically steer the main beam by rotating the main antenna, and/or to mechanically steer the measurement beam by rotating the measurement antenna; and
beam steering circuitry to electronically steer the main beam by adjusting the shape of the main beam, and/or to electronically steer the measurement beam by adjusting the shape of the measurement beam.

19. The antenna system of claim 1, wherein:

the control circuitry is configured to rotate the measurement beam to a measurement angle; and the positions to either side of the initial bearing angle comprise a pair of measurement angles to either side of the initial bearing angle.

20. The antenna system of claim 19, comprising
storage circuitry to store a look-up table (LUT) indicating corresponding measurement angles for each of a plurality of bearing angles of the main beam,
wherein the control circuitry is configured to determine, based on the LUT, the pair of measurement angles corresponding to the initial bearing angle, and to rotate the measurement beam to each of the pair of measurement angles to receive the signals at the positions to either side of the initial bearing angle.

21. The antenna system of claim 20, wherein:

the measurement beam is configured to receive communication signals from a further antenna system;

an antenna array gain of the measurement beam is dependent on the measurement angle and a direction of the further antenna system; and the storage circuitry is configured to store, in the look-up table, the corresponding measurement angles for the plurality of bearing angles of the main beam such that, when the measurement beam is rotated to each of the pair of measurement angles corresponding to the initial bearing angle, gain curves for each of the pair of measurement angles intersect when the direction of the further antenna system is the initial bearing angle, wherein each of the gain curves comprises a graph representing the antenna array gain of the measurement beam as a function of the direction of the further antenna system.

22. The antenna system of claim 21, wherein:

the storage circuitry is configured to store, in the look-up table, the corresponding measurement angles for the plurality of bearing angles of the main beam such that when the measurement beam is rotated to each of the corresponding measurement angles corresponding to a given bearing angle of the main beam, the gain curves for each of the pair of measurement angles intersect at a point which is a predetermined amount below a peak antenna array gain of the main beam when rotated to the given bearing angle; and the predetermined amount is the same for each of the bearing angles.

23. The antenna system of claim 1, wherein
the moving vehicle comprises an aircraft.

24. A method of operating an antenna system for a moving vehicle, the method comprising:
generating a main beam;
generating a measurement beam; and
performing an adjustment process by:
rotating the main beam to an initial bearing angle;
rotating the measurement beam independently of the main beam to receive signals at positions to either side of the initial bearing angle;
comparing at least one metric measured for the signals received by a measurement antenna at the positions to either side of the initial bearing angle to generate a comparison output; and
determining, based on the comparison output, a correction to be applied to the initial bearing angle of the main beam.

* * * * *